Aug. 20, 1940. H. R. MacMICHAEL 2,211,932
METHOD AND APPARATUS FOR ROASTING AND SMELTING IN A HEARTH FURNACE
Original Filed June 21, 1935 7 Sheets-Sheet 2
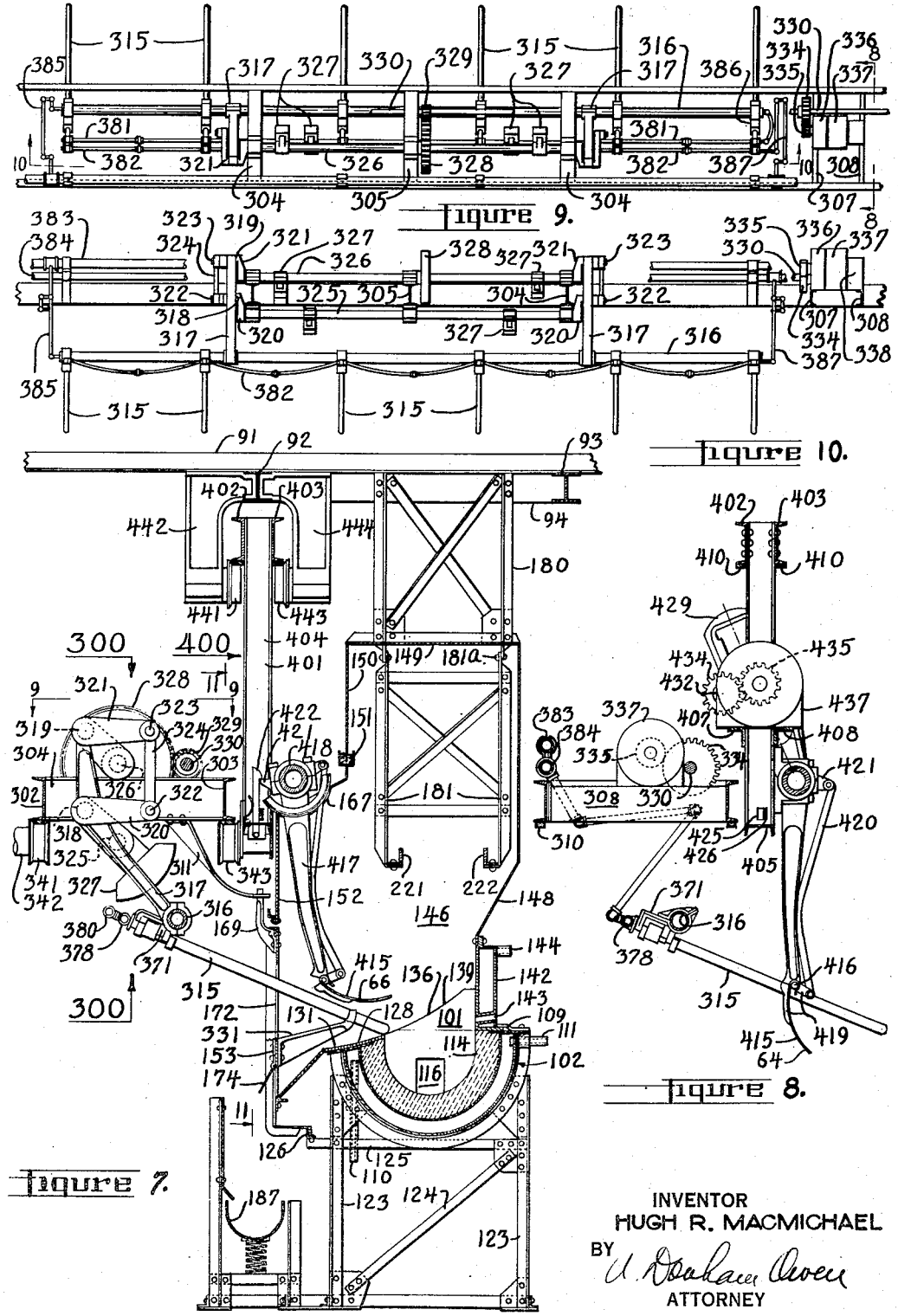
INVENTOR
HUGH R. MACMICHAEL
BY
ATTORNEY

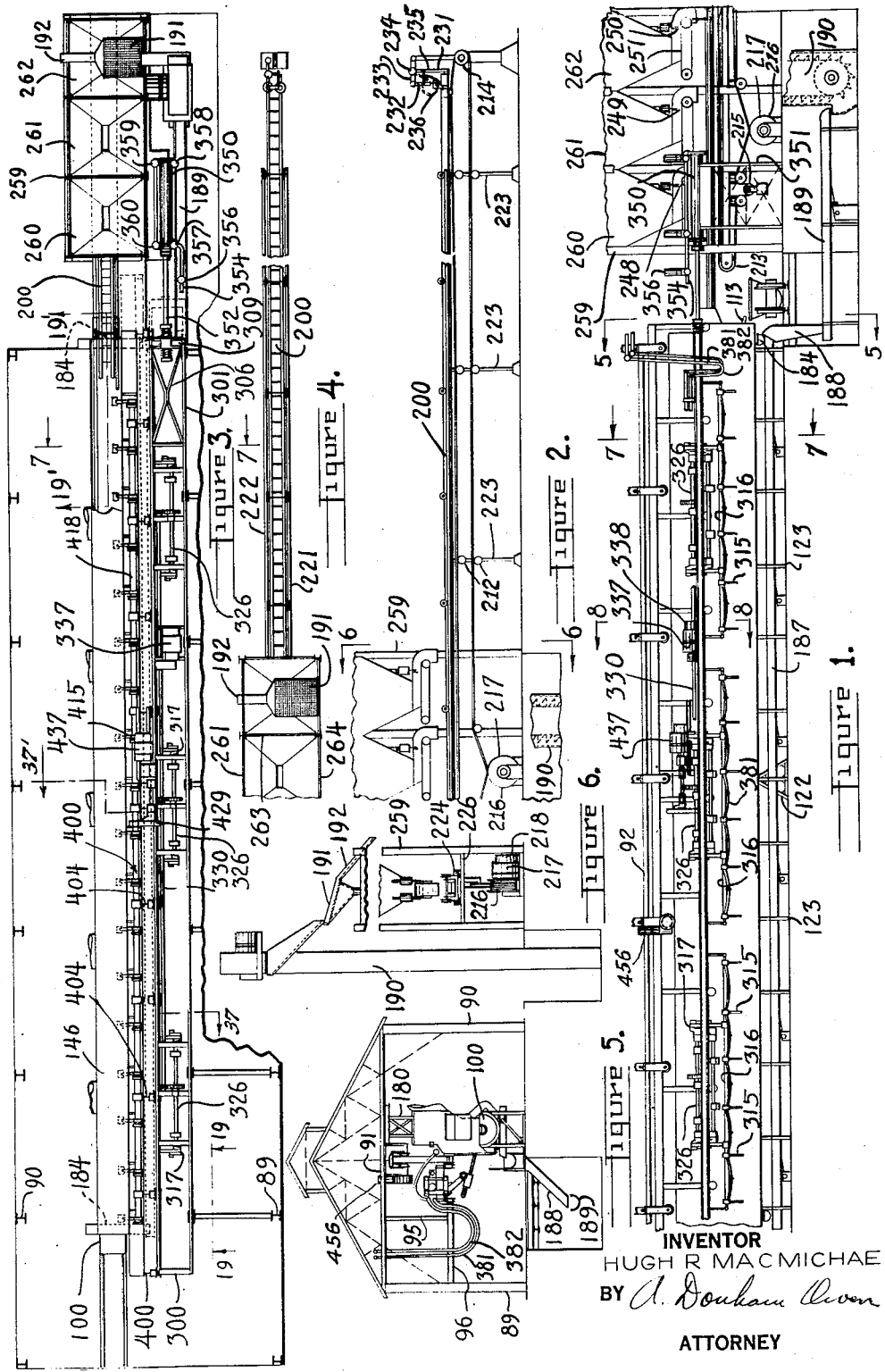

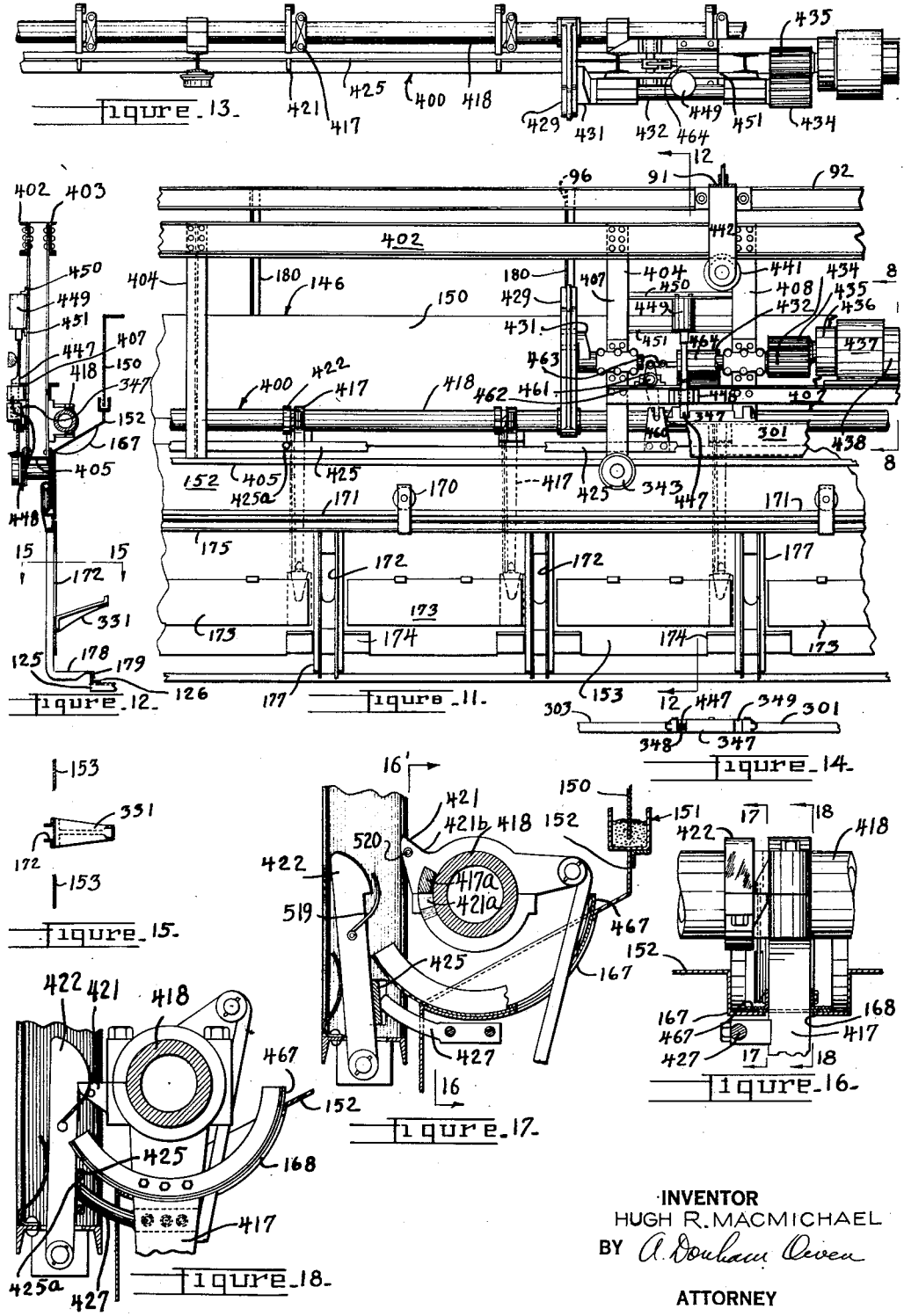

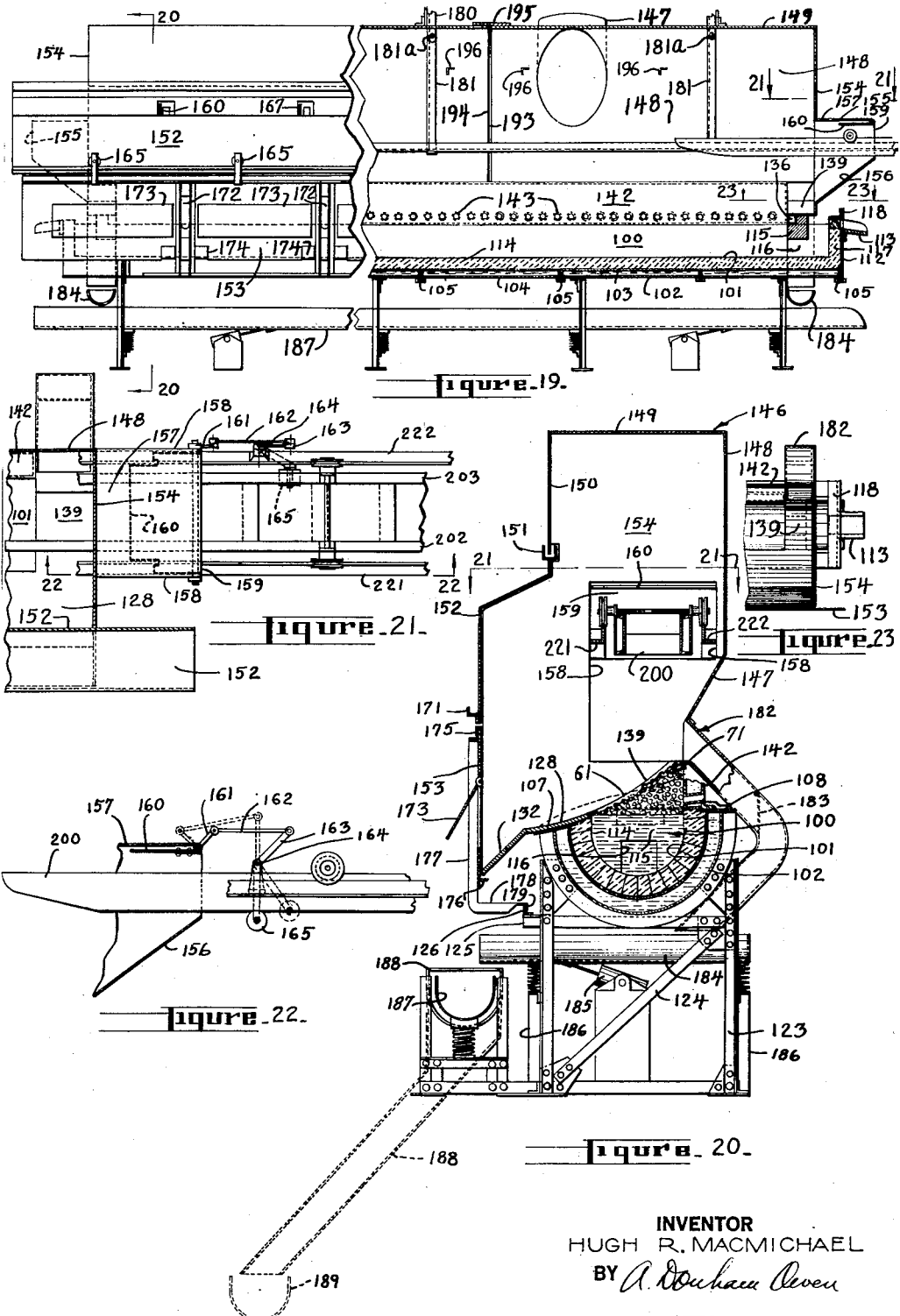

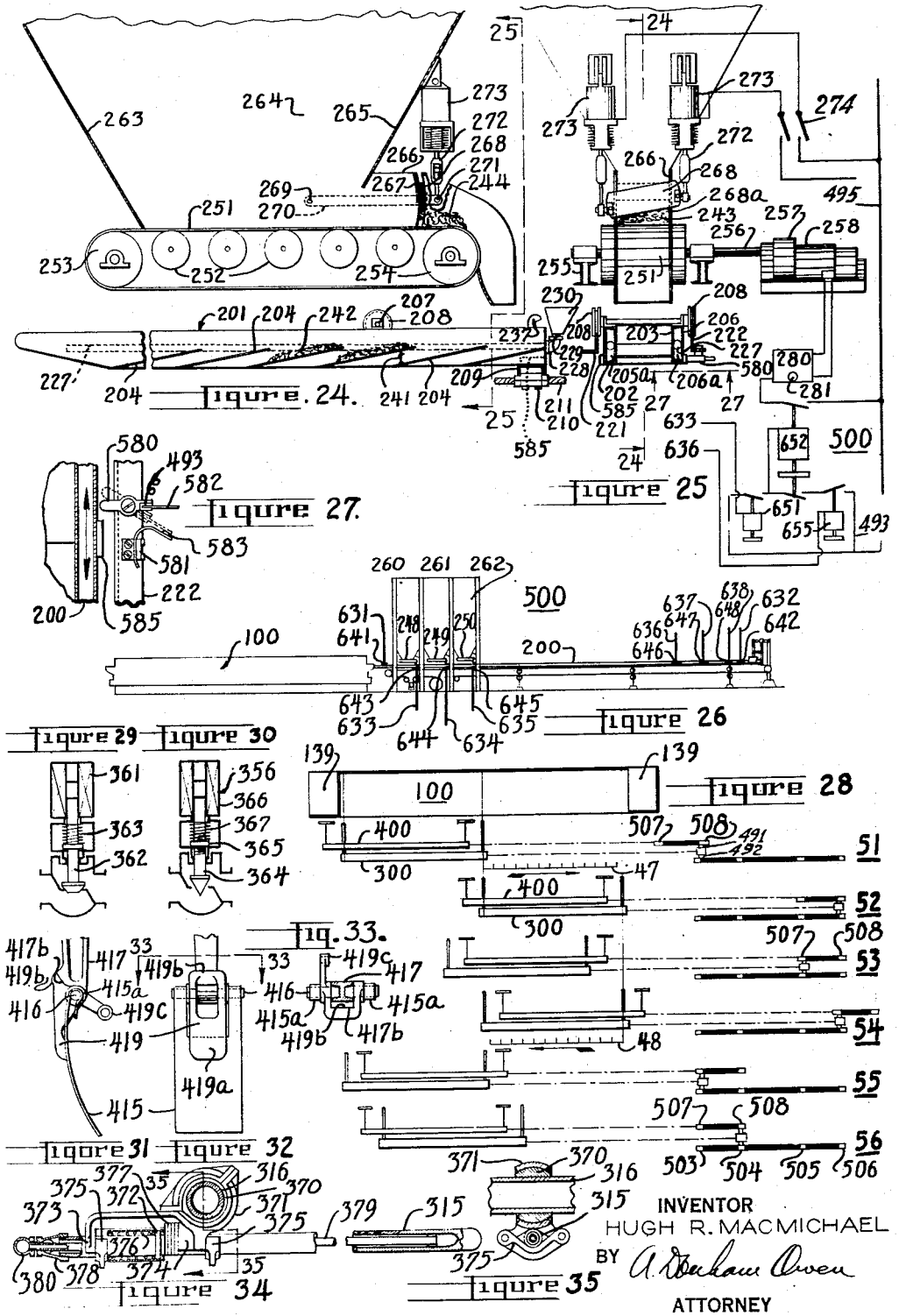

Aug. 20, 1940.    H. R. MacMICHAEL    2,211,932
METHOD AND APPARATUS FOR ROASTING AND SMELTING IN A HEARTH FURNACE
Original Filed June 21, 1935    7 Sheets-Sheet 6

INVENTOR
HUGH R. MacMICHAEL
BY
ATTORNEY

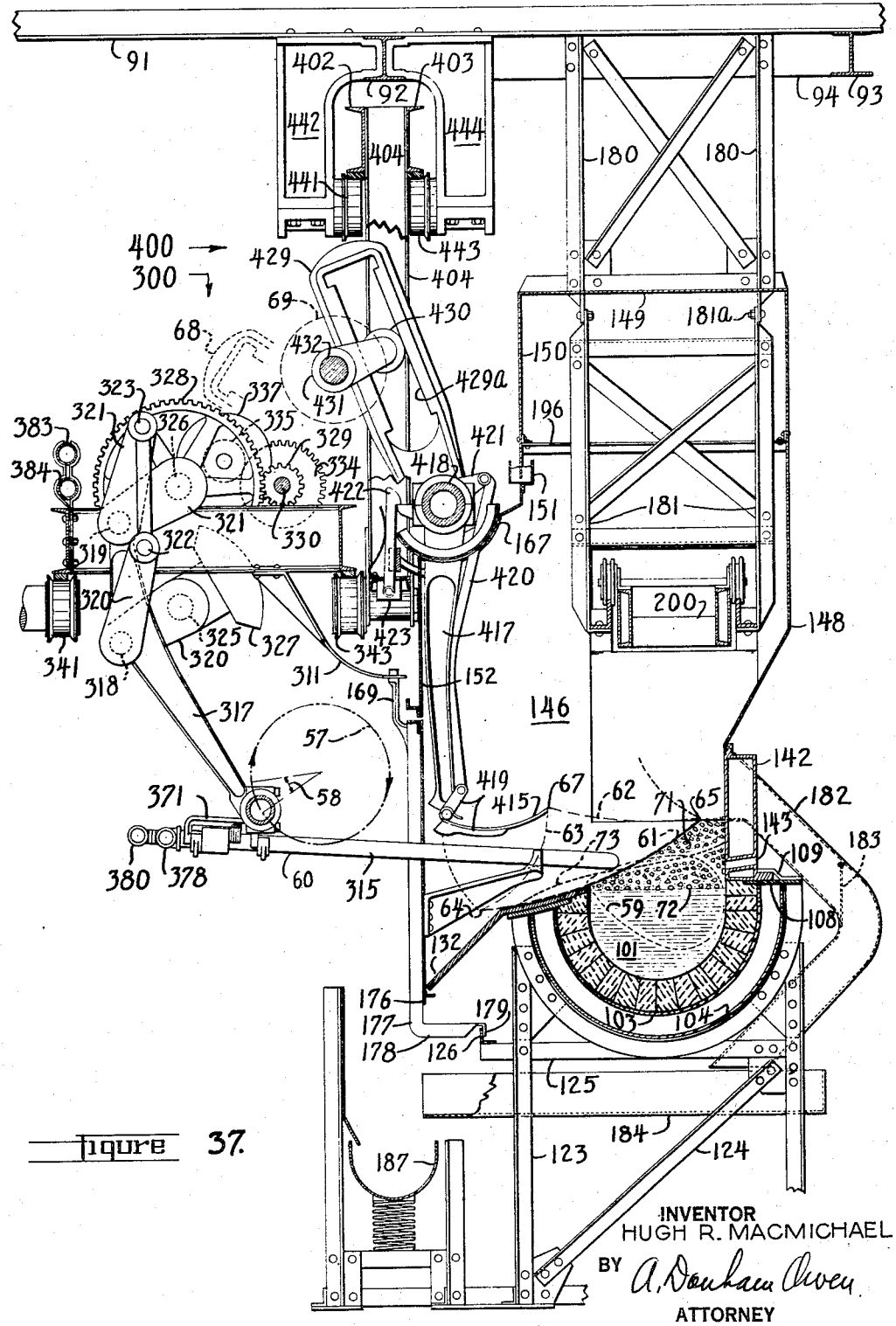

Patented Aug. 20, 1940

2,211,932

UNITED STATES PATENT OFFICE 2,211,932

METHOD AND APPARATUS FOR ROASTING AND SMELTING IN A HEARTH FURNACE

Hugh R. MacMichael, Piedmont, Calif.

Application June 21, 1935, Serial No. 27,697
Renewed July 7, 1939

49 Claims. (Cl. 266—10)

This invention relates to the roasting and to the smelting of lead sulphide ores primarily and has for its objects to provide, first, certain improvements in methods whereby high-grade lead ores may be more economically treated, and second, certain improvements in the metallurgical equipment necessitated thereby.

More particularly, from the principles of the well-known Scotch hearth furnace process, it develops a process whereby, with improved equipment, operations are to be conducted in a large automatically - operated furnace, substantially without manual labor, requiring extremely little repair, operating at a substantially reduced cost, and requiring a substantially lower cost for plant construction.

Some of the disadvantages of the prior Scotch hearth method are that it remains essentially a manual art laboriously and erratically conducted in small one-man furnaces to and from which all treated materials are manually handled at least twice. Each plant generally requires a considerable number of these small furnaces, and in operation they are open to the atmosphere so that an immense amount of outside air is drawn in and mixes with the furnace gas, and all this resultant diluted gas has to be handled through an enormously expensive baghouse for the recovery of the valuable metallic fumes carried from the furnace with said gas. Some of the other difficulties and inadequacies of the processes and devices of the prior art will be noted later.

One object of my invention is to provide a feasible method of charging a small or an extremely large hearth-type furnace whereby each part of the smelting area of said furnace will receive fresh charge accurately and controllably spread in a thin layer generally forty to fifty times per hour on a predetermined schedule, which result I accomplish by the steps of first forming outside of the furnace the various elements of the charge into a unit charge properly proportioned and properly distributed in a thin layer over an area co-extensive with the smelting area in said furnace, and second, depositing the said formed unit charge in smelting position over the entire smelting area of said furnace substantially simultaneously. I preferably include the coke-breeze in each charge, instead of adding it irregularly as heretofore. As a further improvement I prefer to deposit the aforesaid unit charge in the furnace with a controlled spreading effect somewhat simulating the effect in manual charging where the charge on a shovel perhaps a foot square, may be manually spread over several square feet of the furnace. The charge-receiving length of the furnace exceeds the smelting length so that the charge irregularly deposited at each end may be discarded. With the appropriate means which I provide, I effect the described methods of charging with an ideal uniformity of working and smelting results, hitherto continually sought but never attained in the charging of the prior art.

Another object of my invention is to effect the complete separation from the smelting charge of the lump slag which is agglomerate containing the slag-forming elements introduced with said charge, and to discard same from the furnace. A characteristic feature of the Scotch hearth smelting is the discarding of a lump slag instead of a molten slag as in other smelting processes, and the final separation and discarding of these lumps, has hitherto been a manual operation. The charge in a hearth furnace tends to cake and to agglomerate as it smelts and has to be broken up about forty times per hour by a rabbling operation in which a poker is passed into the crucible and up through the overlying smelting charge, the fines of said charge tending to flow around said poker while the coarser lumps selectively tend to be thrown to the surface and out onto the apron along the front of said crucible to a position approximately underlying the line 73 of Fig. 37, from which position in the practice of the prior art substantially the entire charge has been backed immediately to its smelting position in area 70 (Fig. 37), which second operation still leaves the coarser lumps selectively accessible to be manually picked out and manually removed from the furnace. I have discovered that by correlating the force and effect of the rabbling with the width and slope of the apron 128 onto which the rabbled charge is partly displaced, that the coarser lumps may be separated controllably and selectively, and caused to move across said apron, and thereby to be discarded from said furnace. I provide a furnace with its operating equipment which is all suitably correlated in design for the purpose stated, and for the operation of the rabbling poker, I provide a manually-adjustable variable-speed drive. As the throwing force and effect of any movement is substantially proportional to the square of the velocity of said movement, it is then quite feasible to operate the rabbler poker at a speed adjusted to that necessary for controllably discarding the lump slag and at the same time suitably rabbling the charge. While the amount of the lump slag to be discarded can be controlled with considerable accuracy by the means herein provided, I prefer currently to discard some excess, to pass the entire discard over a suitable screen, and to return the finer screened part to the furnace, and finally to discard the coarser part, which latter will then normally be smelted in a blast furnace with the production of a liquid slag very low in lead and suitable for a final waste product.

Another object of my invention is to provide a method for neutralizing a longitudinal shifting tendency of the smelting charge, wherein said charge tends to follow along with the longitudinal movement of the rabbler carriage while the rabbling poker is working in said charge. This shifting tendency takes place even though the rabbler carriage is provided with the so-called step-by-step movement now in common use wherein the rabbler carriage movement is retarded while the rabbling poker is passing up through the charge. With manual backing, the aforesaid shifting tendency was taken care of by the operator in his work of backing and charging the furnace, and with mechanical backing certain expedients were adopted supplemented by manual work. I have discovered that by rabbling the furnace alternately in opposite directions, the longitudinal shifting of the charge is thereby completely neutralized and no other mechanical expedients or manual labor are required in this connection. In order to maintain, by this method, the desired degree of uniformity in the time period between the successive rabblings at all points along the furnace, I find it desirable substantially to reduce the length of the furnace hitherto rabbled by one poker, preferably limiting this distance to about five feet instead of the hitherto customary eight feet. This limitation is decidedly beneficial for a like reason in connection with my method of depositing a unitary charge over the full length of the furnace substantially simultaneously. None of the mechanical rabbling means hitherto available have been adapted either to rabbling alternately in opposite directions, or to rabbling only a short furnace-length with one poker while permitting of reasonable access to said furnace even though it were limited in length to the eight feet hitherto generally used, to say nothing of still longer lengths. I have therefore provided novel rabbling means, and also novel backing means cooperating therewith, for conducting my method of rabbling and of backing, which method has other novel features to be further described.

Another object of my invention relates to a method for conducting a rabbling operation preferably followed concurrently in similar mode by a backing operation, whereby a hearth-type furnace having a length up to one hundred feet or even much longer may be suitably rabbled and backed. For this purpose I use a plurality of rabbler pokers working about five feet apart along the length of the furnace, all said pokers working generally concurrently although not necessarily in unison. I shift these spaced operating pokers about five feet longitudinally relative to said furnace until the spaces intervening between the starting points of the respective pokers in their original positions have been rabbled, and I thus complete a rabbling operation over the entire length of a very long furnace in a very brief space of time, and in like manner the substantially concurrent backing operation is almost simultaneously completed. However, the method as just specified is adaptable whether the space between adjacent pokers is five feet or very considerably more. The reason therefor for specifying about five feet is (a) to avoid an undue variation in the time between the successive rabblings at each and all points along the length of the furnace, when the rabbling operation progresses alternately in opposite directions along said furnace, and (b) when using the unit charge simultaneously deposited over the length of the furnace, a short rabbling space for each poker is desirable to limit the length of time intervening between the rabbling and the quickly following charging at any point along said furnace.

Another object of my invention is to provide a method for substantially limiting the formation of accretions along the back of the furnace crucible at about the level at which the molten metal is normally carried therein. In the prior art the point of the rabbler poker scraped up the back of the crucible on a series of spaced lines corresponding to the step-by-step position of the rabbler carriage. These steps are generally nearly five inches apart and there is no means for systematically scraping the crucible wall intervening between the spaced positions of the said steps, and therefore from time to time a manual scraping operation is required, in an endeavor to avoid which the operator tends to put too much pressure on the mechanical poker contacting the back wall of said crucible thereby eventually causing the destruction of many crucibles. I have discovered that by causing the aforesaid series of spaced lines of the rabbler poker scraping action against the wall of said crucible, on successive rabbling operations, to be on lines substantially intermediate to the said lines of the preceding rabbling operation, I can keep the crucible in good order without resorting to the periodical manual scraping thereof, and with no temptation on the part of the operator to cut out said crucible wall by excessive pressure of said poker. I accomplish this by suitably adjusting the starting point of the rabbler carriage travel on successive cycles of rabbling operation, with due regard to the correlation between said travel and the rabbler poker operation as it strokes up the back of the said crucible, the means for systematically doing which is further described herein.

Another object of my invention is to provide methods of operation, and the equipment, whereby the hearth smelting operation may be conducted with the admission of only a relatively small and controlled amount of outside air to the furnace hood thereby first, permitting a very large reduction in the construction cost of the gas-fume filtration equipment and other means for handling gas, which items together represent the major source of construction cost in a Scotch hearth-type furnace plant, and second, effecting a reduction in the operating cost for handling said gas. In the prior art, along the operator's side of the furnace there is generally a continuous opening about one foot high through which is admitted a large quantity of outside air which mixes with the furnace gases carrying a considerable quantity of metallic fume, thereby necessitating the treatment of all these gases including the infiltrated air for the recovery of said metallic fume, this treatment usually consisting of passing said gases through a woolen cloth filtering medium in so called bag-houses. By my invention, I provide a novel design of furnace and operating means therewith whereby the furnace may remain substantially closed against uncontrolled infiltration of outside air, and by the methods of operation which I prefer, I admit only so much said air as may be useful in maintaining the desired operating condition in said furnace.

Another object of my invention is to provide a crucible furnace of the hearth type which can be maintained in satisfactory operation over a period of years substantially free from repairs, and maintained in accurate working alignment irrespective of its length. This smelting process requires a furnace with an elongated crucible which is normally carried substantially level full of molten metal, the level of which should generally be maintained constant within an inch or so. The crucible is continuously open along one side to permit access of the rabbler and the backer, and if the metal overflows at any point it tends to solidify on the furnace apron 128 and requires manual labor for its removal and rehandling. If the molten metal level is unduly lowered by drawing off from the furnace too much metal there is a tendency to form accretions along the back and front of the crucible at approximately the normal level of the molten metal and the operating conditions become unsatisfactory. The mechanical backer 400 is adapted to back and reform the rabbled charge on certain predetermined lines and the relative levels of the backer and the furnace must be accurately maintained for said operation. The mechanical rabbler 300, in its work of rabbling the smelting charge and limiting accretions on the back wall of the crucible without causing wear thereto, (also performing a somewhat similar service along the front edge of said crucible), must have a furnace maintained in accurate lateral alignment as well as level in working relation with said rabbler. Furnaces with crucibles carrying molten metal are generally limited to a length of about five times their width and generally they warp to a considerable extent. However, as (a), the walls enclosing such smelting furnaces generally continue upward all around the crucible thereof to substantially above the normal level of the molten metal therein, and as (b) they generally do not have mechanical operating means required to work in close and fixed relation with either one or both sides of their crucibles, nor (c) to have a side continuously open just above the molten-metal level for the access of any operating means, the walls of said furnaces and their crucibles can warp laterally and there can also be vertical upheavals both without detriment to the service to be rendered and generally their main requirement is that they continue to hold metal and that the walls and roof do not fall in. For my invention, I prefer a furnace with a length at least ten times its width and preferably at least sixty times the width where the total daily tonnage of ore to be treated thereby is adequate to keep a furnace of this size occupied. Hitherto there has been no metallurgical crucible furnace having anything remotely approaching such ratios of length to width, or the necessity of carrying the molten metal substantially level full along an open side of its crucible, or the necessity for maintaining itself in accurate working relation with other operating means, and having any or all of these requirements combined with a furnace preferably of fifty to one hundred and fifty feet in length, and which must be maintained tight against the leakage of a low melting point metal such as lead which tends to seep interminably through hot masonry or even through otherwise imperceptible passages in cast-iron containers. The means provided for securing a thoroughly reliable construction to meet these extraordinary requirements with substantially complete freedom from repair is part of my invention.

Another object of my invention is to provide a rabbling device adapted: (a) to rabble uniformly and rapidly a furnace of great length such as one hundred feet more or less; (b) to cause the coarser lump slag of the smelting charge to be selectively and controllably discarded from the furnace, the rabbler mechanism being provided with a variable-speed drive and the furnace apron 128 having a width and slope all especially adapted for said object; (c) to limit the formation of accretions on the rear wall of the furnace crucible by scraping same on a plurality of series of spaced lines controllably positioned to effect a substantially longitudinally continuous scraping operation within every few minutes of operating; (d) to work on any of the new cycles of rabbler operation herein proposed as well as by any of the modes of the prior art; (e) to accomplish these objects with only a negligible open area into the hood of the furnace through which the rabbling pokers move in their work; (f) to provide a rabbling poker which can work for days without change, as contrasted with the poker of the prior art which rapidly overheats and commonly has to be changed several times in each hour of operation; and (g) to do all this with a simple rugged construction substantially free of upkeep and repair requirements.

Another object of my invention is to provide a backing device adapted: (a) to cooperate suitably in all respects with the aforesaid rabbling device: (b) to sweep the dead-plates 139 at each end of the furnace of the surplus charge accumulating thereon from the rabbling and backing operations and also that deposited from the charger 200; (c) to be moved into transposed position relative to the rabbler so that rabbling and backing operations may proceed alternately in opposite directions along the furnace; (d) to perform the backing operation with means extending into the furnace through generally sealed openings thereto; and (e) to do all of this with a simple rugged construction with advantages such as above specified for the rabbler construction.

Another object of my invention is to provide an automatic control system adapted: (a) to control the suitable charging of the furnace; (b) to control the starting and the stopping of any and all of the mechanically conducted operations for the service of said furnace; and (c) to provide adjustable means whereby each operation can be adjustably controlled to give the best results for any of the possibly widely variable operating conditions to be met with in the treatment of different metalliferous ores or materials, each with possibly widely varying percentages of differing slag-forming elements contained therein, sometimes using different fuels, and all at varying tonnage rates. In the prior art, the controlling means for the rabbling and the backing device generally provided only for stopping the same at the end of a one-way operating movement and also at the end of an idling return movement, the starting of both movements being manually effected. The completely adjustable, accurate and automatic control of a process using a series of inter-related operations, each to be repeated preferably forty to fifty times per hour at each and all points along the furnace, provides advantages obvious to anyone skilled in the art, and especially when contrasted with the practical impossibility of accurate control where arduous manual labor is involved as always present in the art as hitherto practiced.

Another object relates to the substantially complete elimination of the considerable amount of irregular manual labor required on account of the unavoidably disorderly and irregular conditions generally present in the laborious operation hitherto conducted in the smelting practice with a Scotch hearth type of furnace even provided with the best mechanical equipment hitherto available, which object I have accomplished by the substitution of clean, orderly, mechanically conducted operations at all essential points combined with the practical elimination of the nonessential work.

To an important degree this invention relates to improved methods of conducting a roasting and a smelting process on the principles of the well-known Scotch hearth process. In part, these methods may be put into effect on manually operated furnaces or by various sorts of construction or mechanical devices some of which are known in the prior art and some of which might be provided by means varying considerably in detail one from the other. To obtain the full advantage of all the methods which I have described, I have invented a novel hearth type furnace and novel means adapted to the charging, rabbling and backing of said furnace, both the furnace and the means cooperating therewith having many advantages in themselves over anything for the like purpose in the prior art.

Although the novel features which are believed to be characteristic of this invention will be particularly pointed out in claims appended hereto, the invention itself, as to its objects and advantages, the mode of its operation and the manner of its organization may be better understood by referring to the following description taken in connection with the accompanying drawings forming a part thereof, in which:

Fig. 1 is a general side elevation of the furnace with its rabbling and backing mechanism, and its charge bins.

Fig. 2 is a side elevation continuing to the right from Fig. 1 showing the extended track under the charger.

Fig. 3 is a general plan of the arrangement corresponding to the side elevation in Fig. 1.

Fig. 4 is a general plan corresponding to the side elevation in Fig. 2.

Fig. 5 is an end elevation showing the furnace in its building looking from the line 5—5 of Fig. 1.

Fig. 6 is an end elevation looking from the line 6—6 of Fig. 2.

Fig. 7 is a cross section through the rabbler, the backer and the furnace taken on line 7—7 of Fig. 3.

Fig. 8 is a cross-section through the rabbler and the backer taken on the line 8—8 of Figs. 1, 9 and 11.

Fig. 9 is a partial plan of the rabbler, as viewed from the line 9—9 of Fig. 7.

Fig. 10 is an elevation of the rabbler taken on the line 10—10 of Fig. 9.

Fig. 11 is a partial side elevation of the backer and the furnace hood (only), as viewed from the line 11—11 of Fig. 7.

Fig. 12 is a cross-section of the backer taken on the line 12—12 of Fig. 11, (omitting the solenoid 464).

Fig. 13 is a partial plan of the backer looking down on Fig. 11.

Fig. 14 is a partial plan of the rabbler showing parts 301 and 347 of Fig. 12.

Fig. 15 is a partial plan of the lower front hood plate and the poker fulcrum taken on the line 15—15 of Fig. 12.

Fig. 16 is a partial side elevation of the backer arm on its actuating shaft, taken on the irregular line 16—16' of Fig. 17.

Fig. 17 is a cross-section through the backer main shaft taken on the line 17—17 of Fig. 16.

Figure 36:
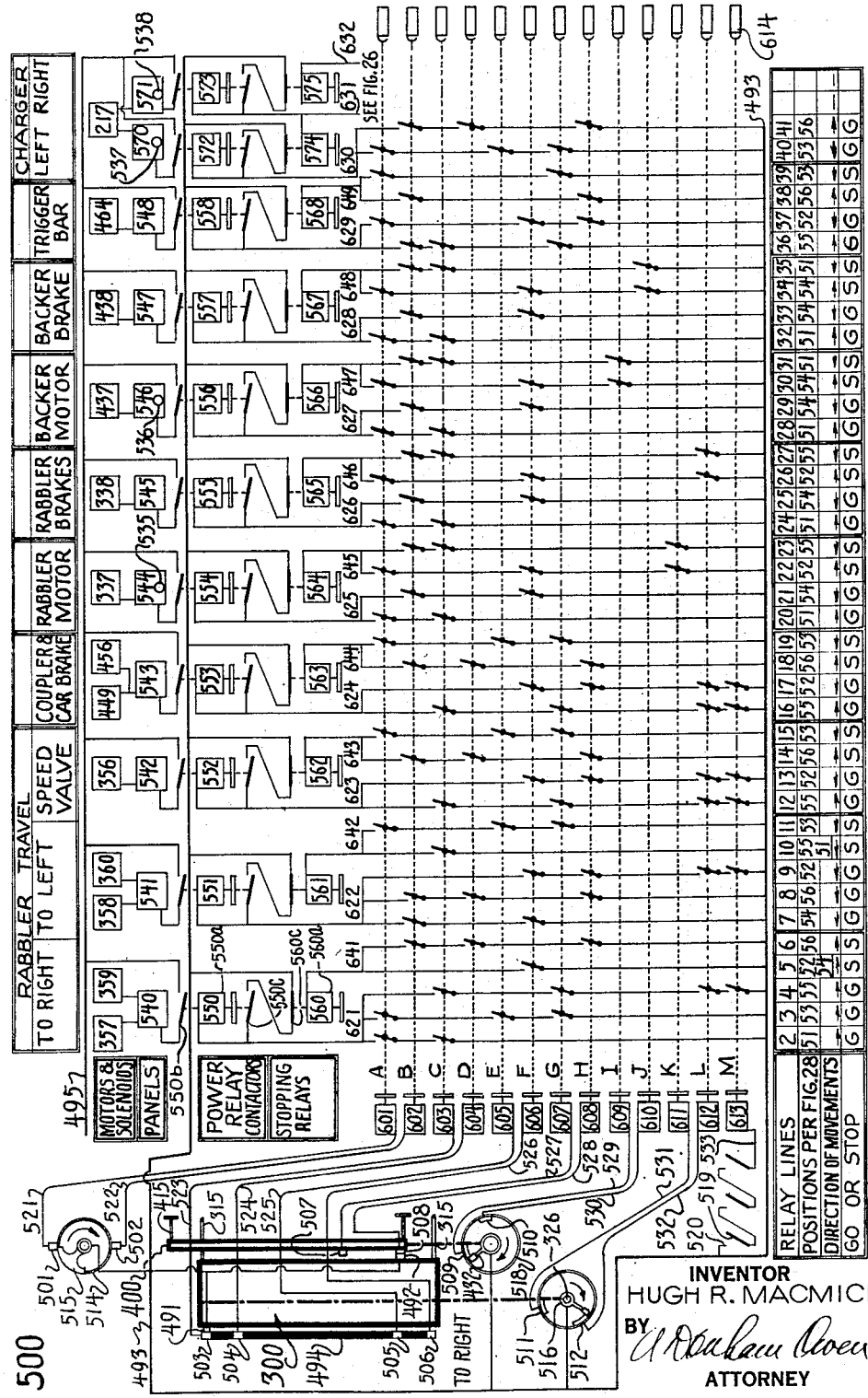

Fig. 18 is a cross section through the backer main shaft taken on the line 18—18 of Fig. 16, but showing the rocker lever 421 rotated for engagement with the trigger 422.

Fig. 19 shows a longitudinal elevation of the furnace and hood partly as viewed on the outside of the line 19—19, and partly in cross section as viewed from the line 19'—19', both of Fig. 3.

Fig. 20 is a cross-sectional elevation through the furnace and the hood taken on the line 20—20 of Fig. 19, and also showing the cross section of the charger when in that location.

Fig. 21 is a cross-sectional plan at one end of the hood taken on the line 21—21 of Fig. 19, the level of which line is also marked for convenience in Fig. 20.

Fig. 22 is a cross-sectional longitudinal elevation of one end of the hood with part of the charger taken on the line 22—22 of Fig. 21.

Fig. 23 is a partial plan of one end of the furnace taken on the line 23—23 of Fig. 19.

Fig. 24 is a longitudinal cross-section through a charge bin, a feeder and the charger taken on the line 24—24 of Fig. 25.

Fig. 25 is an end view of the bin and the feeder, and a cross-section of the charger, taken on the line 25—25 of Fig. 24 and also shows the control diagram for the feeder arrangement.

Fig. 26 is a diagrammatic elevation of the furnace and the charging device, showing the relative location of the electric terminals for the charger and the feeder control.

Fig. 27 is a diagrammatic detail of the electric terminal switch for the control of the feeders and the charger.

Fig. 28 is a diagram showing the various relative positions of the furnace, the rabbler and the backer.

Fig. 29 shows diagrammatically the solenoid operated hydraulic valves used on the cylinder which impart movement to the rabbler and the backer.

Fig. 30 shows diagrammatically the solenoid operated hydraulic valve for speed control.

Fig. 31 is a detailed end elevation of the backer shovel.

Fig. 32 is a detailed side elevation of the backer shovel.

Fig. 33 is a section through the backer shovel arm taken on line 33—33 of Fig. 32.

Fig. 34 is a detail of the rabbler poker.

Fig. 35 is a cross-section through the rabbler poker taken on the irregular line 35—35'.

Fig. 36 is a diagram of the electrical control governing the operation of the rabbler, the backer and the charger.

Fig. 37 is a cross-section taken on the line 7—7 of Fig. 3 similar to that of Fig. 7, and shows various paths of motion and different positions of the smelting charge.

Like reference characters denote like parts in the several figures of the drawings. For convenient reference the various main parts have been given certain groups of numbers as follows:

| | |
|---|---|
| Building | 88– 96 |
| Furnace | 100–199 |
| Charger | 200–245 |
| Feeders and bins | 246–299 |
| Rabbler | 300–399 |
| Backer | 400–489 |
| Control system | A to M, 2 to 73, and 491 and up |

*The building*

The building 88 (see Figs. 1 and 5) enclosing and in parts supporting the furnace 100 and certain equipment operating therewith, has the left columns 89 and the right columns 90 carrying the trusses 91 supporting the longitudinal beams 92 and 93 between which are carried a plurality of the cross-beams 94, the trusses also each supporting a hanger 95 carrying one end of the cross-beam 96 supporting one side of the rabble 300 and being supported by the column 89 on the other end.

*The furnace*

The furnace 100 has a crucible 101 enclosed by a semi-circular jacket 102 having an inner plate 103, and an outer plate 104 connected by the end flange plates 105 which extend outward and are provided with bolt holes. Along the top of the front of said jacket 102 is the plate 107 extending outward and provided with holes for bolts attaching the apron 128 and also extending inward to keep the brick 114 from being floated out by the molten lead of the crucible in operation. In like manner the plate 108 forms the top back of said jacket 102 and extends inward for retention of the brick 114 and extends outward adapted for bolting on the clips 109 for retaining the tuyère jackets 142 in position. The pipes 110 are connected into the front of said jacket 102 and are adapted for the inlet and outlet of circulating water, the pipes 111 being connected into the back of said jacket 102 for a like purpose, all said pipes being connected very close to the top of the space in said jackets 102 so that air or steam may not be trapped therein to a harmful degree. For a long furnace the jacket 102 may conveniently be made in sections ten to fifteen feet long and bolted together by the flange plates 105. At each end of the crucible is an end plate 112 bolted to a flange 105 of the adjacent jacket 102 and adapted to support a spout 113 through which the molten metal may be tapped from the crucible 101. The crucible is provided with a longitudinal brick lining 114 and near each end are the bridge walls 115 with the passage 116 leading to the spout 113. At each end of the crucible 101 a brick lining 117 is prevented from being floated out by an angle 118 attached to the end plate 112. At about the middle of its length the crucible 101 is firmly supported by the A frame 122 and it has additional spaced supports 123 with the diagonal bracing 124 firmly supporting the crucible 101 laterally but permitting of longitudinal expansion and contraction as caused by temperature variations of said crucible 101. Said supports 122 and 123 have each the strut 125 carrying the longitudinal angle 126 by means of which the hood plate 153 is maintained substantially in contact with the apron slope plate 132 as later described.

An apron 128 made in sections of convenient length extends along the front of said crucible 101 being bolted to said crucible plate 107. An apron slope plate 132 is suitably secured to the outer edge of the apron 128 and extends downwardly at an angle adapted to the passage by gravity of discarded lump slag and has a sliding contact with the hood plate 153. The top surface of the apron 128 is curved parallel to the line 61 representing the path of the shovel 415 as it backs rabbled charge displaced on said apron 128 back to its smelting position in the area 71 (see Fig. 37). Enclosing the smelting length of the furnace 100 are the jackets 136 at each end thereof with suitable water circulating pipes for inlet and outlet (not shown). The jacket 136 has an extended top forming a dead-plate 139 which at its outer ends is connected with the hood end plate 154, said dead-plate 139 being adapted to receive surplus charge from the charger 200 and the charge worked onto it by the rabbler 300 and the backer 400. The top surface of both said dead-plates 139 and the adjacent apron 128 are parallel with the line 61 representing the path of the backing shovel 415 on its backing stroke, said shovel 415 being adapted to sweep the dead-plate 139 thereby ejecting surplus charge from it through the chute 182 attached to the hood plate 148.

Over the back side of the crucible 101 are the conventional tuyère jackets 142 provided with the spaced openings 143 for admission of an air blast to the furnace 100 by conventional tuyères and air blast supply system (not shown), said tuyère jacket 142 being provided with the water circulating pipes 144 for circulation of water through said jacket 142 in the usual manner. The jackets 142 are retained in place on the crucible 101 by the bolted clips 109 and at the top are connected with the hood back plate 148.

The furnace 100 is enclosed with a hood 146 with the draft outlets 147 through which a draft is maintained to draw off the gases from the operating furnace 100, said hood being made sufficiently gas tight as substantially to exclude the infiltration of outside air into said furnace. The hood 146 has a back plate 148, a top plate 149, a top front plate 150 engaging a sand seal 151 carried by a movable middle front plate 152 which movably supports the lower front plate 153, said hood having the end plates 154 carrying the end extensions 155 each having a bottom slope plate 156, a top plate 157 and the side plates 158, said extension 155 opening into said hood 146 and at its outer end having the charger opening 159 normally closed by a door 160 which may be opened by means of the lever 161, the link 162, the lever 163 carried by the center pivot 164 and on its other end having the roller 165 adapted to contact the charger 200 so that as the latter goes through the door 160, it is automatically opened and remains so until the charger 200 emerges therefrom. The door 160 with the operating means just described is shown in Fig. 22 for the right hand end of the furnace 100 where the charger 200 enters, and the like extension 155 carrying like door 160 at the left hand end of the furnace 100 (not shown in detail) is substantially identical except that the means for opening said door comprising items 161 to 165 inclusive are positioned to open said door 160 as the charger approaches same from the inside of the furnace 100 instead of from the outside of said furnace as at the right hand end thereof.

The middle front plate 152 is supported by the backer 400 for longitudinal movement therewith and for each backer arm 417 said front plate 152 is provided with a dished section 167 having a slot 168 through which said arm 417 is admitted for its work in the furnace 100, said arm 417 carrying a curved seal plate 467 adapted substantially to seal said slot 168 irrespective of the swinging movement of said arm 417.

The lower front plate 153 is carried by the double flanged wheels 170 movable on a Z-bar 171 fixed on the lower edge of the middle front plate 152. Said plate 153 is divided into longitudinal sections about fifteen feet in length as later noted and each section is provided with the finger 169 adapted to engage in a hole of the bracket 311 attached to each of the rabbler cross-beams 304, whereby said plate 153 is imparted longitudinal movement in fixed relation with the rabbler 300. For each rabbler poker 315 the plate 153 is provided with a slot 172 through which said poker can work on the smelting charge in the furnace 100, and underneath each slot 172 the fulcrum piece 331 is rigidly supported by said plate 153 for the support of the furnace end of the rabbler poker 315. The slots 172 having a width but little more than the diameter of the poker 315 and being in the lower part of the furnace 100 where the draft is the least, no provision is shown for preventing the infiltration of some air through said slots although such means could readily be provided if desired. The plate 153 is provided with the inspection doors 173 by means of which the operator may observe the condition and the working of the furnace 100 and perform any incidental manual operations which it may require. Said doors 173 may be propped or maintained open to permit of a controlled admission of outside air to the furnace 100 for the purpose of reducing the average temperature inside of said furnace. In the lower part of said plate 153 are suspended the swinging doors 174 normally closed and opened by the force of the discarded lump slag for the passage of which said doors 174 are adapted. The angles 175 and 176 extend longitudinally on the plate 153 which is further stiffened by the vertical angles 177, which have the horizontal part 178 terminating in the vertical part 179 movably contacting with the longitudinal angle 126 supported by the cross-member 125 of the crucible supports 122 and 123 which arrangement is adapted substantially to maintain a movable contact between the hood plate 153 and the apron slope plate 132.

The front plates 152 and 153 movable respectively with the backer 400 and the rabbler 300, substantially contact with the end plate 154 at each end of the hood 146 and therefore said movable plates 152 and 153 extend a sufficent distance beyond each end plate 154 as required to maintain a contact therewith irrespective of the longitudinal movements of the backer 400 and the rabbler 300, said extension being indicated in the plan of Fig. 21.

The hood 146 is supported from above by the hangers 180 carried by the building cross-beams 94 which hangers also carry the brackets 181 from the pivots 181a for the support of the charger track angles 221 and 222 and permitting for the longitudinal expansion thereof.

Near each end thereof the back plate 148 connects with the outlet chute 182 provided with a freely swinging vertical gate 183 and adapted to receive the material swept from the dead-plate 139 by the backer 400 and pass said material through the cross-conveyor 184 which is of the conventional electrical vibrator type actuated by the electro-magnet 185 and carried on the supports 186, and delivers said material to the longitudinal vibrator conveyor 187 conventionally shown, which delivers through a chute 188 leading to a conveyor 189 leading to a bucket elevator 190 which discharges to the vibrator screen 191 where the finer screened material passes to a bin 262 while the coarser screened material is finally discarded through a chute 192.

The temperature inside the furnace hood 146 will rise to several hundred degrees Fahrenheit and said hood may be insulated appropriately to reduce radiation therefrom as a matter of comfort and for the benefit of the adjacent mechanical equipment, insulation also being possible for parts of the mechanical equipment when desirable.

The hood 146 will be provided for longitudinal expansion with the expansion joints 193, (see Fig. 19) having between adjacent parts of each hood plate the open space 194 of about one inch covered by the butt-strap 195 firmly attached to the plate of one part and adapted to slip over the like plate of the adjoining part, as shown in cross-section on the top plate 149 of Fig. 19 and in elevation on the back plate 148, said expansion joints being put in each of the longitudinal hood plates 148, 149, 150, 152 and 153 at about fifteen foot intervals in the length of the same, the inspection door 173 being loosely hinged so as to work freely across said expansion joints. The hood plates 148, 149 and 150 will be supplied with adequate stiffening angles (not shown), and between the plates 148 and 150 will be suitably spaced strut-angles 196 (see Figs. 19 and 20).

*The charging system*

The charger 200 has a longitudinal frame 201 composed of a left channel 202 and a right channel 203 between which are carried a plurality of spaced sloping flat plates 204, the bottom of one said plate overlapping the top of the next louver fashion. The plates 204 have a slope somewhat less from that of the angle of repose of the charge as it is dropped from the feeders 248, 249 and 250 to the charger 200, which slope may approximate a twenty percent grade, sloping downward in the direction in which the charger is moving as it decelerates for dropping its carried charge into the furnace 100. The closure plates 205 and 206 are welded to the channels 202 and 203 respectively thus making a water-tight space 205a and 206a respectively adapted to the circulation of water by means later noted.

The frame 201 is suspended from a plurality of spaced axles 207 carried by the wheels 208. The charger 200 is imparted longitudinal movement through its end beam 209 having a rope clamp 210 attached to a rope 211 operating over the idler sheaves 212, the left end sheave 213, the right end sheave 214, the tightener 215 and is driven by the winch 216 through the motor 217.

The motor unit 217 is preferably a direct-current compound-wound, variable speed four-to-one ratio, reversible motor especially adapted for frequent quick starting and stopping provided with a solenoid brake 218, and having the automatic control panel 570 actuated by the power contactor 572 (see Fig. 36) for movement to the left toward the furnace 100 and the panel 571 actuated by the power contactor 573 for movement to the right away from said furnace, each said automatic panel being electrically interlocked with the other and equipped for push-button remote control, and having the shunt-field rheostats respectively 537 and 538 manually adjustable for controlling the speed separately in each direction of said motor 217. At its lowest speed the motor 217 will be adapted to impart movement to the charger 200 to the right at a speed of about four feet per second under the control of the panel 571 and the contactor 573, which movement is brought to a stop by the action of the solenoid brake 218 on said motor 217 when the current is cut off same. At its highest speed said motor 217 will impart movement to said charger 200 to the left at a controlled speed up to about sixteen feet per second under control of the panel 570 and the contactor 572, which movement will be controllably decelerated by the solenoid-brake 218 with said motor 217, said brake being rendered inoperative when current is supplied to said motor 217, and by means of adjustable spring or dead-weight pressure becoming operative instantly when the current is cut off therefrom.

The charger 200 is movably supported by the track angles 221 and 222 having a right end support 223, the intermediate supports 224, the bracket supports 225 on the feeder floor 226, and through the building being supported from the trusses 91 by hangers 180 and their pivotally carried extensions 181, said pivots 181a being adapted to permit of the deflection of the lower end of the hanger 181 due to the longitudinal expansion by heat of the track angles 221 and 222.

The channels 202 and 203 are each cooled by water passing to the left end thereof through the pipes 227 enclosed in the spaces 205a and 206a respectively, said pipes each having a connection 228 with a riser 229 in a funnel 230. At the right end of the travel of the charger 200 the funnel 230 contacts with a movable arm 231 attached to a swivel pipe 232 connected with a fixed pipe 233 provided with the plug valve 234 with its handle 235 and the connecting link 236 attached to the swivel pipe 232 whereby said valve 234 is caused to open when the charger 200 reaches its right end extreme position as shown in Fig. 2 and thereby water is circulated through the spaces 206a and 205a and overflows from the connections 237 on each of said channels 202 and 203.

Between the louver-like plates 204 is the vertical space 241 and when loaded the plates will carry the charge somewhat as indicated in the shaded area 242, which charge has dropped from the feeders 248, 249 and 250, which feeders pass the charge through the shaded area 243 showing the heavier charge on the right hand side corresponding to the tuyère side of the furnace 100. The shaded area 244 shows the charge passing longitudinally under the cut-off gate 268 later described.

The belt feeders 248, 249 and 250 are substantially identical as further described for the feeder 248 which has a conveyor belt 251 supported on the idlers 252, a tail pulley 253 and a head pulley 254 all carried on the frame 255 by the feeder floor 226, said head pulley 254 being driven by a shaft 256 connected with a geared speed reducer 257 driven from a motor unit 258.

The posts 259 support the bins 260, 261 and 262 each having a back plate 263, side plates 264 and the front plate 265 provided with an opening 266a extending between the cheek plates 266 connected by a baffle plate 267 through which opening the charge or material carried in said bin may pass out under the control of the sector gate 268 carried from the pivots 269 by the levers 270 each having the front pivot 271 supported by a turnbuckle 272 suspended from the solenoid magnet 273 supported from the bin front plate 265. Each end of said gates 268 has its support as described and is thereby separately adjustable as to the height of the opening 268a left between it and the feeder belt 251, the turn buckle 272 being adapted for ample manual adjustment and the solenoid 273 for a limited remote-control electrical adjustment by the manual operation of a switch 274 of which there is one conveniently located for each solenoid 273. Each of the bins 260, 261 and 262 has a feeder, respectively 248, 249 and 250, each arranged in like manner for delivering the charge in said bin by said feeder to the charger 200.

The motor unit 258 is preferably a direct-current compound-wound variable speed motor especially adapted for frequent quick starting and stopping and provided with its integral solenoid brake (not shown) and having an automatic control panel 280 adapted for operation manually and also from the control system 500, and having a shunt-field rheostat 281 manually adjustable for controlling the speed of said motor 258.

*The rabbler and backer*

The rabbler 300 has a carriage 301 having the longitudinal channels 302 and 303 with wearing strips 310 supporting a plurality of spaced cross-beams 304 carrying the ends of the crank-shafts 325 and 326, and the cross-beams 305 supporting the middle of said shafts, all held square by a cross-bracing 306, having also motor-supporting cross-beams 307 and 308 and end beam 309 adapted to receive the force imparting movement to said carriage 301. Attached to each beam 304 is a bracket 311 having a hole in which loosely fits the finger 169 attached to each longitudinal section of the hood plate 153 thereby holding said plate 153 in fixed relation for longitudinal movement with the rabbler 300.

A group of pokers 315 are each supported ball-joint fashion by a shaft 316 carried by a pair of arms 317, each arm being pivotally supported by the crank pins 318 and 319 of double-throw cranks 320 and 321 respectively. Said cranks each have another pin 322 and 323 respectively located at ninety degrees from the pins 318 and 319, and connected by a link 324 which together with the upper part of said arms 317 will always remain in a vertical position while being moved in a circular path by said cranks 320 and 321 respectively keyed on the shafts 325 and 326 journalled near each end on the beams 304 and at a middle point on the beam 305, and having the counter-weights 327 counter-balancing the load carried by said cranks. The shaft 326 is driven by the gear 328 from the pinion 329 on a line shaft 330 journalled on the series of beams 304 and 305, said shaft 330 having a plurality of said pinions 329 adapted to drive the plurality of the shafts 326 for the groups of pokers 315. The poker 315 is supported at its furnace end (alternately) on the fulcrum 331, and in another part of its stroke by the inner edge of the apron 128, and on its outer end by the shaft 316 operating with a clock-wise circular motion on line 57 thereby producing a rabbling motion adapted to break up the smelting charge as it occupies approximately the shaded area 71 (see Fig. 37) supported on molten metal normally substantially on line 72, thus displacing the charge to a position approximately underlying the line 73.

The shaft 330 is driven through its gear 334 and the pinion 335 by the geared speed reducer 336 and the motor unit 337 (both conventionally indicated) to operate the rabbler shaft 316 in its circular motion at a speed of about thirty revolutions per minute with variations generally not exceeding ten percent down and twenty percent up.

The motor unit 337 is preferably a direct-current compound-wound variable-speed four-to-one ratio, reversible motor especially adapted for frequent quick starting and stopping provided with its integral solenoid-operated brake (not shown) and having an automatic control panel 544 (see Fig. 36) adapted for operation manually and also from the control system 500, said panel also having a shunt-field rheostat 535 manually-adjustable for controlling the speed of said motor 337. Said motor 337 is provided with an auxiliary solenoid brake 338 with its automatic control panel 545 adapted for operation manually and also from the control system 500. Both the integral solenoid brake with the motor 337 and its auxiliary brake 338 are held operative by adjustable spring pressure and rendered inoperative when supplied with electric current in accordance with the customary practice. The said integral brake therefore becomes instantly operative when the current is cut off said motor 337 thereby rapidly decelerating same, and after a predetermined decelerating motion, the auxiliary brake 338 becomes operative thereby almost instantly stopping the motor with the pokers 315 in a predetermined position and all under the control of the control system 500.

The rabbler carriage 301 is provided with fixed wearing strips 310 and is supported on a plurality of the double flanged wheels 341 and 343, the wheels 341 being mounted in fixed position on a support 342 carried on the beams 96 suspended from the truss 91 by the hangers 95 as part of the building in Fig. 5; the wheels 343 being attached to and movable with the backer carriage 401 as therewith described. The rabbling frame channel 303 is provided with a coupler body 347 containing two sockets 348 and 349 through which the coupler pin 447 on the backer carriage 401 can be engaged. When said pin 447 engages in the socket 348 the rabbler 300 is in a position relative to the backer 400 for an operating cycle to the right, and when said pin 447 engages in the socket 349 the rabbler 300 is in a relative position for an operating cycle to the left, the rabbler 300 in all cases being adapted to impart longitudinal movement to the backer 400 through the coupling pin 447.

The rabbler 300 is shown in Figs. 1 and 3 with three six-poker units making a total of eighteen operating pokers 315, and is longitudinally moved by the attached piston rod 352 of the hydraulic cylinder 350 carried by the support 351. Water under uniform hydraulic pressure is to be supplied for the cylinder 350 operation through the pressure pipe 354 from a suitable hydraulic system (not shown), waste water being suitably disposed of through the outlet pipe 355. Motion to the right is controlled by the inlet valve 357 and the outlet valve 359 simultaneously operated, and motion to the left by the inlet valve 358 and the outlet valve 360. These four valves are identical and are as diagrammatically indicated in Fig. 29 where the solenoid magnet 361 acts on the valve stem 362 to open said valve which is closed by the spiral spring 363 when the electric current is cut off. These valves consequently are quick acting with an absolute minimum of wear due to throttling effect. The speed control is affected by the valve 356, Figs. 1 and 3, which is diagrammatically detailed in Fig. 30. The threaded valve stem 364 is adjustable up or down by the nut 365 to pass water at a rate suitable for a slow speed movement. For a high speed movement the valve stem 364 is raised by the solenoid magnet 366 said stem being automatically returned to the lower position by the spring 367 when the electric current is cut off. Said valve 356 being always substantially open, the cutting action of the throttled water is distributed over hard extensive surfaces of the slow wear on which is immaterial. The pressure valves 357 and 358, controlling movements of the rabbler, may be provided with adjustable dash-pots (not shown) to ease the opening of said valves, and between the two ends of the hydraulic cylinder 350 may be placed pressure relief valves (not shown) which will cushion the stopping of the rabbler 300 by allowing water at excess pressure to escape from one to the other end of said cylinder, one pressure relief valve working in one direction being required for each of the directions of movement imparted by said cylinder.

The shaft 316 is provided with the sleeves 370 (see Fig. 34) with partly spherical outer surface each carrying a poker holder 371 for the poker 315, thereby permitting a variation in all directions of the angle of the axis of the poker 315 relative to the axis of the shaft 316. The poker 315 has a fixed collar 372 which holds it longitudinally in the holder 371 provided with the shoulders 373 and 374 by which the poker 315 is retained at two spaced points by the pivoted and bolted caps 375. The collar 372 bears against the pressure relief spring 376 on its upper side, and against the removable U-shaped filler pieces 377 shown on the lower side and movable to the upper end of the spring 376 as the point of the poker 315 wears. The poker 315 is referably constructed of a double extra-heavy pipe closed at the lower or furnace end and at its upper end provided with a pipe-fitting cross 378 through outer end of which passes the tube 379 connected directly with the T 380, said tube 379 extending close to the lower end of the hollow poker 315 for purposes of circulating a cooling fluid through said poker. The cooling fluid, preferably oil or air, is supplied and exhausted respectively through the longitudinal pipes 383 and 384. For each shaft 316 with its carried pokers 315, the swivel pipe connections 385 connect with one end of the shaft 316, its other end being connected through the flexible tube 386 to the longitudinal flexible tube 381, the latter being connected through and between the crosses 378 whereby the fluid enters the pokers 315, leaving by the tubes 379, connected into the T's 380 through and between which is connected the flexible tube 382 leading to the swivel pipe connection 387 and thence through the pipe 384 and the flexible tube 389 to a suitable circulating system (not shown). The flexible tube 388 connects from said circulating system to the pipe 383 described above.

The backer 400 has a carriage 401 with longitudinal channels 402 and 403 with wearing strips 410, supporting a plurality of vertical posts 404 tied together with bottom channel 405, all held square by cross-bracing 406 and having also motor-supporting beams 407 and 408.

A shovel 415 with supporting loops 415a (see

Figs. 31, 32 and 33) is pivotally carried on a pin 416 fixed in an operating arm 417 keyed to a longitudinal shaft 418. A compound lever 419 is pivotally supported on the pin 416 and its part 419a supports the back of the shovel 415, its part 419b is adapted to contact with a lug 417b on the operating arm 417 thereby limiting the rotation of the lever 419. The part 419c is pivotally connected with a link 420 pivotally supported by a rocker lever 421 actuated by its lug 421a engaging for movement over to the left with the arm lug 417a and having a detent 421b adapted to engage with a trigger 422 pivotally supported on a bracket 423 and contacting with a pressure spring 424 tending to maintain said trigger 422 in a vertical position, (see Fig. 18). The movable bar 425 supported in slots 426 in the posts 404 is movable laterally by a finger 427 attached to the arms 417 thereby disengaging the trigger 422 moving it into the position shown in Fig. 17 as the arm 417 swings to the lower and outer part of its stroke, and thereby the rocker lever 421 rotates from the position in Fig. 18 to that shown in Fig. 17 which, through the link 420 and the lever 419, permits the shovel 415 to rotate down on the line 63 of Fig. 37 to a position on the line 64 ready for its effective backing stroke into the furnace. The shovel 415 is shown in its working position relative to the arm 417 in Figs. 31 and 32 where the lever 419b contacts with the operating arm lug 417b thereby supporting the shovel 415 for its backing stroke whereby the rabbled charge approximately underlying the line 73 (Fig. 37) is swept back to its smelting position in the furnace in approximately the shaded area 71. As the shovel reaches its upper position on the line 61, the rocker lever 421 engages the trigger 422 thereby causing the shovel 415 to rotate on its supporting pin 416 as the operating arm 417 swings downward causing the lower edge of the shovel 415 to follow the line 62 until the shovel arrives in the position 67 whereupon it drops to the operative position 64 as previously described, and in which drop the edge of the shovel should clear the top surface of the apron sufficiently to avoid striking any of the smelting charge or agglomerate which may be rabbled thereon in the operation of the furnace.

The longitudinal shaft 418 carrying a plurality of the operating arms 417 is made of relatively large diameter thereby maintaining said arms 417 in substantially parallel operating relation due to the stiffness of the shaft 418 permitting of only a negligible amount of torsional twist, said shaft 418 being journalled on the post 404 and given an oscillating rotary motion by the rocker arm 429 moving between its position shown in Fig. 8 and its lower position on dotted line 68, said rocker arm 429 being provided with a slot 429a in which the crank pin roller 430 is moved on the circular path 69 by the crank 431 keyed to the shaft 432. The amplitude of the motion of the rocker arm 429 can be varied if desired by changing the radius of the crank 431 and adjusting the angular position of said arm 429 relative to the shovel operating arm 417. The crank shaft 432 is driven through the gear 434 from the pinion 435 by the geared speed reducer 436 and the variable-speed motor unit 437 (both conventionally shown) adapted to drive the crank-shaft 432 at about twenty-seven revolutions per minute with a variation generally less than ten percent up or twenty percent down.

The motor unit 437 is in all respects similar to the motor unit 337 already described and has its similar control panel 546 with a shunt-field rheostat 536, the auxiliary solenoid brake 438 and its control panel 547, all being adapted to operate the backer shovels 415 and to stop them in a predetermined position.

The backer 400 is supported on a plurality of the double-flanged wheels 441 and 443 mounted respectively on the brackets 442 and 444 supported by the building beams 92 and the truss 91. Mounted below the posts 404 are the double-flanged wheels 343 adapted to the vertical support of the rabbler channel 303 which in turn gives lateral support to the bottom of the backer 400.

A longitudinal movement is given the backer 400 by the rabbler 300 through the coupling pin 447 working in the socket 448 supported on the angle 407, said pin 447 engaging with the coupler body 347 mounted on the rabbler channel 303 and having a socket 348 in which said pin 447 engages when the rabbler 300 and the backer 400 are both operating with a movement to the right, and the socket 349 with which said pin 447 engages when rabbling and backing are proceeding to the left. The pin 447 is held down in an engaging position by the tension of a spring (not shown) and is raised for disengaging by the action of the solenoid magnet 449 carried by the angles 450 and 451 on the backer 400, said solenoid 449 having its automatic control panel 543 adapted for operation manually and also from the control system 500 by the contactor 553 (Fig. 36).

Connected in parallel with the solenoid 449 from its control panel 543 operated by the contactor 553, is a backer carriage solenoid brake 456 (see Figs. 1 and 5) which is a conventional solenoid-actuated band brake connected through the axle of one of the wheels 441 to prevent any movement of the backer carriage 401 when the coupling pin 447 is disengaged and the rabbler 300 is being moved to the alternative position relative to the backer 400. Said brake 456 is operated only when supplied by the electric current and is held inoperative by the action of a spring (not shown), and a plurality of said brakes 456 being used respectively with a plurality of said wheels 441 should more than one brake be found necessary.

The longitudinal shaft 418 is hollow and connected at each end respectively with the flexible tubes 457 (see Fig. 5) and 458 (not shown) connected respectively with the longitudinal pipes 383 and 384 on the rabbler 300 thereby providing for the circulation of a fluid adapted to maintain the temperature circumferentially of said hollow shaft 418 sufficiently uniform as to avoid warping due to the heat radiated from the furnace 100, which heat strikes mainly one side of the oscillating shaft 418.

When the rabbler 300 shifts to its alternative position with respect to the backer 400, the rabbler pokers 315 are stopped in a predetermined position as indicated by position 60 (Fig. 37) and while the backer operating arm 417 continues its swinging movement, the shovel 415 moves only on the line 62 which is caused by permitting the trigger 422 to remain engaged with the rocker lever 421. Normally the finger 427 (see Figs. 17 and 18) contacts the bar 425 as the arm 417 swings down thereby releasing the trigger 422, and when this release is to be avoided the bar 425 is longitudinally shifted to bring its spaced holes 425a opposite the spaced fingers 427, the shifting of said bar 425 being effected by its rigidly attached slotted arm 460 engaging with the lower end of the lever 461 pivoted on the shaft 462 and rocked by the pull of the connected solenoid magnet 464, the return to normal working position being effected by the tension of a spring (not shown). The solenoid 464 is provided with its automatic control panel 548 which supplies current to said solenoid 464 when the power contactor 558 is closed by means indicated in Fig. 36. All details are to be proportioned so that when the relative positions of the rabbler 300 and the backer 400 are to be transposed, a clearance will be maintained between the poker 315 and the shovel 415 as hitherto described and approximately as shown for the outer position of the shovel in 67 of Fig. 37.

The backer 400 carries a movable part 152 of the hood 146 provided with slots 168 through which the backer arms 417 and the links 420 are admitted into the space inside the hood. The arm 417 has attached the radial angles 465 and 466 (see Figs. 16, 17 and 18) carrying a curved plate seal 467 adapted substantially to seal the said slot 168 in the hood plate 152 irrespective of the motion of the swinging arm 417. The seal 467 and the angle 465 is provided with a slot 468 for the passage of the link 420.

The backer arms 417 are relatively light but they might be balanced in their swinging motion by suitably placed counterweights or by spring tension. While the temperature inside the hood 146 to which these arms 417 may be subjected is variable with different ores and dependent somewhat on the running of the furnace as controlled by its operator, it is not expected that said temperature will rise to a point that will be harmful to said arms, but if unexpected extreme temperatures should arise, the arms could be made tubular in cross-section and provided with means for the circulation therein of a cooling medium somewhat after the fashion of the arrangement for the pokers 315.

The control system

An operation control system generally designated as 500 (see Figs. 25, 26, 28 and 36) is adapted for the automatic, timed and correlated control of the rabbler 300, the backer 400, the charger 200 and the feeders 248, 249 and 250. All operations are effected by electric motors, or electric solenoid magnets operating directly, or indirectly for the control of certain hydraulic valves, said motors and solenoids each having its conventional automatic control panel adapted for manual operation but normally actuated to produce motion while and as long as said panel receives current from a power relay contactor 550 and the like (see Fig. 36). Said power relay contactors are energized by relay current received from a relay switch, or more often a plurality of relay switches connected in series, each switch of any series being separately operated by a multipole relay 601 and the like energized from a terminal 501 and the like registering a relative position of some moving part, or a time period existing on an operation timer 514. The electrical return lines are to be considered as grounded and are not shown on the drawings.

The description given will relate to: first, the operating movements and motions, and reference to smelting charge positions; second, the time registering terminals 501 and 502 and the position registering terminals 503 to 513 inclusive in detail; third, the means actuated through the aforesaid terminals thereby starting and stopping the various motive means, as diagrammatically shown in Fig. 36; fourth, the control for the charger and feeders.

Fig. 28 diagrammatically shows: a shortened furnace 100 of a length suitable for a rabbler 300 with two pokers 315 and at each end having the dead-plates 139, a backer 400 with two shovels 415, the registering electric terminals 503 to 506 inclusive to be suitably positioned on a building beam 96 (see Fig. 5), the terminals 507 and 508 carried by the backer 400 and positioned apart from each other a distance corresponding to about twice the distance between the centers of the poker 315 and the shovel 415 in working position relative to each other, the terminal 491 fixed on the rabbler 300 and adapted to contact with any of said terminals 503 to 506 as the rabbler 300 moves into appropriate position relative to same, and the terminal 492 likewise fixed on the rabbler 300 and adapted to contact with the backer terminal 507 to register relative positions of the rabbler 300 and the backer 400 for a left hand rabbling and backing operation, and likewise to contact with the backer terminal 508 to register for a right hand rabbling operation. The series of spaced lines 47 positioned relatively on the length of a section of the furnace 100 represent approximately the points at which a poker 315 strokes up in a right-hand rabbling operation, relative to the like series of spaced lines 48 for a left-hand cycle, the lines 47 of one cycle being substantially intermediate to the like lines 48 of an alternate cycle, thereby securing a substantially continuous scraping effect against the back of the crucible 101 of the furnace 100 by two or more rabbling operations.

In Fig. 28 the position opposite 51 is that in which a left-hand operating cycle has been terminated, the rabbler and the backer remaining completely stationary until a right hand cycle is initiated by the operation timer 514 whereupon the rabbler and the backer move and operate until they reach position 52, when the rabbler pokers 315 are stopped in a pre-determined part of their motion, the backer coupler disengages and the backer brake becomes operative, the backer shovel 415 oscillates only on the line 62 (see Fig. 37) and the rabbler moves to the left, with a higher speed caused by increased opening of the valve 356, until the rabbler reaches position 53. Except that the pokers 315 still remain unoperated, the normally working backer and the rabbler move together at normal speed to position 54, the right-hand shovel 415 of the backer sweeps any material from the right-hand dead-plate 139, and all movement and motion stops with the backer shovels at a pre-determined point later described. Promptly thereafter the charger 200 deposits the charge in the furnace 100 and there ensues a mechanically quiescent smelting period in the furnace 100 until the operation timer initiates another operating cycle.

The left-hand backing and rabbling operation is in all respects similar to the right-hand operation, except with the corresponding movements respectively in the opposite direction. Position 55 shows the rabbler 300 with its rabbling work completed in a left-hand cycle and position 56 shows the rabbler 300 in transposed position relative to the backer 400 ready for a final movement back to position 51 which is at the end of the left-hand cycle and likewise at the beginning of the right-hand cycle.

Movement is imparted to the poker 315 by its operating shaft 316 moving on the circular path 57 (see Fig. 37) which movement is always to be stopped in the part 58 of said circle 57, the working point of the poker 315 having been caused to move substantially on the line 59 and said poker occupying approximately the position shown on the position 60 when it is stopped.

The backing shovel 415 moves inward along the line 61 (see Fig. 37) in its effective backing action and returns outward out of contact with the charge along the line 62 and suddenly drops along the line 63 to the starting position as shown at 64 (see Fig. 8). When the shovel 415 is stopped it will be approximately in the position 66 (Fig. 7) while the position 67 (see Fig. 37) is when the shovel 415 is ready to drop down the line 63. Motion is imparted to the shovel 415 through the oscillation of the rocker arm 429 from the position shown to the dotted position 68 by circular motion of the crank pin roller 430 on the line 69.

The smelting charge in the furnace 100 occupies approximately the shaded area 71, supported on top of the molten metal normally at about the line 72 and aproximately underlying the line 61 of the backing action of the shovel 415. When the charge is rabbled by the action of the poker 315 it is displaced from the area 71 and aproximately underlies the dotted line 73 from which position it is returned by the action of the backing shovel 415. An operation timer 514 (see Fig. 36) has its adjustable variable-speed mechanism to operate its rotor 515 at a speed generally between twenty and twenty-five revolutions per hour, said rotor 515 being connected at its center with the direct-current low-voltage relay bus 493, and from zero to one hundred and twenty degrees in its revolution contacting the terminal 501 for a right-hand operating cycle of rabbling, etc., and in like manner from one hundred and eighty to three hundred degrees (in the second half of its revolution) contacting the terminal 502 for a left-hand operating cycle.

The longitudinally movable rabbler 300 (see Fig. 36) has fixed on it the relay current fingers 491 and 492 receiving current from the relay bus 493 through a flexible connection. On a building beam 96 are suitably mounted the spaced terminals 503 to 506 inclusive adapted to receive current from the rabbler finger 491 as the movement of said rabbler brings said finger in contact with one of said terminals, said movements of the rabbler 300 being diagrammatically shown in Fig. 28 and hitherto described.

The rabbler contact finger 492 is adapted to contact with either of the terminals 507 and 508 carried in fixed position on the backer 400, the terminal 508 being positioned relative to the finger 492 for a cooperative rabbling and backing operation to the right, and the terminal 507 being correspondingly positioned for an operation to the left, along the furnace 100.

When the rabbler motor 337 (see Fig. 36) is to be stopped, the current will be cut off as the contact rotor 516 mounted on the rabbler crank shaft 326 contacts with the fixed terminal 511 thereby delivering relay current through said terminal from the bus 493. The motor 337 will then be rapidly decelerated by its integral solenoid brake and as the decelerating crank shaft 326 brings the rotor 516 in contact with the terminal 512, the auxiliary solenoid brake 338 will be applied, thereby almost instantly stopping said motor with the poker carrying shaft 316 in a position on the arc 58 of Fig. 37.

When the backer motor 437 is to be stopped, the current will be cut off as the contact rotor 518 mounted on the backer crank shaft 432 contacts with the terminal 509 thereby delivering relay current through said terminal from the bus 493. The motor 437 will then be rapidly decelerated by its integral solenoid brake, and as the decelerating crank shaft 432 brings the rotor 518 in contact with the fixed terminal 510, the auxiliary solenoid brake 438 will be applied, thereby almost instantly stopping said motor with the backer shovel 415 in the position 66 of Fig. 7.

When the relative positions of the rabbler 300 and the backer 400 are to be shifted from position 52 (see Fig. 28) to position 53, or from position 55 to position 56, the backer shovel 415 is held latched-up to operate on the line 62 of Fig. 37 by the action of the solenoid 464 rendering inoperative the release of the trigger 422, said inoperative position of all said triggers 422 being registered by the contact finger 519 mounted on each trigger 422 closing a circuit through the contact pin 520, and having a set of said contact fingers and pins for each trigger 422, all sets being connected in series, as diagrammatically indicated in reduced number of three sets only in Fig. 36, by means of which, relay current from the bus 493 is delivered to the multipole relay 613.

The aforesaid terminals 501 to 513 inclusive are adapted to transmit low-voltage relay current through the lines 521 to 533 inclusive and respectively, to actuate the multipole relays 601 to 613 inclusive and respectively which relays are diagrammatically shown (see Fig. 36) spaced in a vertical row and adapted to actuate their respective draw-bars A to M inclusive, thereby in each case closing all the respective contact switches (or poles) connecting therewith and designated as A2, etc., in like manner. Said draw-bars are held with switches open by springs 614 except when said relays are energized by relay current as hitherto described.

Parallel to said draw-bars A to M inclusive and below same is the relay bus 493 connecting with the spaced vertical relay lines 2 to 41 inclusive passing up across the non-conductive draw-bars A to M inclusive, and at certain intersections between the spaced horizontal draw-bars A to M inclusive and the spaced vertical relay lines 2 to 41 inclusive are the contact switches each having a designation by capital letter corresponding to that of the draw-bar A to M by which it is actuated, followed by a designation by a number corresponding to the number of the vertical relay lines 2 to 41 in which it is placed, as for example, A2 is the contact switch in the vertical line 2 actuated by the draw-bar A from the multipole relay 601 actuated by current through the line 521 from the timer 514 by its contact 501 which initiates an operating cycle with the rabbler moving to the right, and all other of the contact switches of the multipole relays may be traced back in like manner from its designation (to be given) and the preceeding descriptions, or very readily by reference to the diagram of Fig. 36.

The said contact switches are as follows:

A2, A3, A11, A15, A19, A20, A22, A24, A26, A28, A30, A32, A34, A37, A39, A40.

B6, B7, B8, B14, B18, B21, B23, B25, B27, B29, B31, B33, B35, B36, B38, B41.

C2, C4, C10, C12, C16, C20, C23, C24, C27, C28, C31, C32, C35, C36.

D6, D8, D14, D18, D41.

E3, E11, E15, E19, E40.

F5, F7, F9, F13, F17, F21, F22, F25, F26, F29, F30, F33, F34, F37.
G3, G4, G11, G12, G15, G16, G19, G38, G39, G40.
H6, H8, H9, H13, H14, H17, H18, H37, H38, H41.
I-30, I-31.
J34, J35.
K22, K23.
L4, L9, L12, L13, L16, L17, L26, L27.
M4, M9, M12, M13, M16, M17.

Summing up,

Draw-bars A and B each operate sixteen contacts
Draw-bars C and F each operate fourteen contacts
Draw-bars D and E each operate five contacts
Draw-bars H and I each operate ten contacts
Draw-bars J and K each operate two contacts
Draw-bar L operates eight contacts
Draw-bar M operates six contacts On account of the easier understanding of the diagram in Fig. 36, I have shown the vertical relay lines 2 to 41 inclusive as thirty-nine separate lines whereas there are only about sixteen different groups necessarily used. The electrical expert will therefore readily understand that only the said reduced number of lines is essential provided opening relays are used between the upper terminals of said lines and the power contactors 550 to 558 inclusive and 572, all actuated thereby. However, as the relay current passing at any point through the control system is only that commonly handled by a push-button contact, the whole equipment is extremely small and easily taken care of and requires little attention whichever way it is made.

The power relay contactors 550 to 558 inclusive, 572 and 573 each have an upper main contact which closes to transmit current from the power bus 495 to the conventional automatic switchboard panels 540 to 548 inclusive, 570 and 571, which panels are each adapted to start and maintain in operation their respective controlled motors or solenoids as long as said panels receive current from their respective connected power relay contactors, and thereafter stopping said motors or solenoids.

Said power relay contactors 550 to 558 inclusive and 572 (omitting 573) are each closed and opened by means of current supplied through the relay lines 2 to 41 inclusive (except the opening of contactor 572), all said contactors working on the same principle and the detailed working of the contactor 550 will be described as an example.

When the rabbler and backer are to be moved from position 51 (see Fig. 28), the vertical relay line 2 has its contact switches A2 and C2 concurrently closed, relay current is passed from the bus 493 to the line 621 to the coil 550a of the contactor 550 thereby closing the upper power switch 550b and also its lower relay switch 550c, which latter continues to supply relay current to the coil 550a through the normally-closed opening-relay 560 from the relay bus 493 irrespective of the opening of said switches A2 and C2; and when position 52 (see Fig. 28) is reached, the contactor 550 will be opened by the concurrent closing of the switches (one in this case) in the vertical line 5 thereby supplying current through the line 641 to the opening-relay coil 560a thereby opening its switch 560c thereby interrupting the relay current to the contactor 550 causing the latter to open its switches 550b and 550c, to remain open until again closed by means as first described acting through the line 621. Having described the mode of operation of the power relay contactors similar to the contactor 550, the operating connections for, and the purpose of each one of these said contactors will now be described.

The contactor 550 is closed by the line 621 connected to the lines 2, 3 and 4 for positions 51, 53 and 55 respectively; and is opened by the relay 560 by the line 641 connected to the line 5 for positions 52 and 54, and to line 6 for position 56; thereby actuating the panel 540 for the control of the solenoid hydraulic valves 357 and 359 for imparting a right-hand movement to the rabbler 300.

The contactor 551 is closed by the line 622 connected to the lines 7, 8 and 9 for positions 54, 56 and 52 respectively; and is opened by the relay 561 by the line 642 connected to the line 10 for positions 55 and 51, and to line 11 for position 53; thereby actuating the panel 541 for the control of the solenoid hydraulic valves 358 and 360 for imparting a left-hand movement to the rabbler 300.

The contactor 552 is closed by the line 623 connected to the lines 12 and 13 for positions 55 and 52 respectively; and is opened by the relay 562 by the line 643 connected to the lines 14 and 15 for positions 56 and 53 respectively; thereby actuating the panel 542 for the control of the solenoid regulating valve 356 causing it to open wider for the more rapid travel of the rabbler 300.

The contactor 553 is closed by the line 624 connected to the lines 16 and 17 for positions 55 and 52 respectively; and is opened by the relay 563 by the line 644 connected to the lines 18 and 19 for positions 56 and 53 respectively; thereby actuating the panel 543 for the control of the solenoid 449 for disengaging the coupler pin 447 which interlocks the rabbler 300 and the backer 400 for movement together, and it also controls the solenoid brake 456 causing it to be operative while the rabbler 300 is moving and the backer 400 is held stationary.

The contactor 554 is closed by the line 625 connected to the lines 20 and 21 for positions 51 and 54 respectively; and is opened by the relay 564 by the line 645 connected to the lines 22 and 23 for positions 52 and 55 respectively; thereby actuating the panel 544 for the control of the motor 337 imparting motion to the rabbler pokers 315.

The contactor 555 is closed by the line 626 connected to the lines 24 and 25 for positions 51 and 54 respectively; and is opened by the relay 565 by the line 646 connected to the lines 26 and 27 for positions 52 and 55 respectively; thereby actuating the panel 545 for the control of the auxiliary solenoid brake 338 operating with the motor 337 causing the partly decelerated motor to be quickly stopped.

The contactor 556 is closed by the line 627 connected to the lines 28 and 29 for positions 51 and 54 respectively; and is opened by the relay 566 by the line 647 connected to the lines 30 and 31 for positions 54 and 51 respectively; thereby actuating the panel 546 for the control of the backer motor 437 imparting motion to the backer shovels 415.

The contactor 557 is closed by the line 628 connected to the lines 32 and 33 for positions 51 and 54 respectively; and is opened by the relay 567 by the line 648 connected to the lines 34 and 35 for positions 54 and 51 respectively; thereby actuating the panel 547 for the control of the auxiliary solenoid brake 438 operating with the motor 437 causing the partly decelerated motor to be quickly stopped.

The contactor 558 is closed by the line 629 connected to the lines 36 and 37 for positions 55 and 52 respectively; and is opened by the relay 568 by the line 649 connected to the lines 38 and 39 for positions 56 and 53 respectively; thereby actuating the panel 548 for the control of the solenoid 464 rendering the release of the triggers 422 inoperative.

The contactor 572 is closed by the line 630 connected to the lines 40 and 41 for positions 53 and 56 respectively; and is opened by the relay 574 connected to the line 631 (see Fig. 26).

Near the right hand end and on one side of the charger 200 is a lug 585 (see Fig. 27) adapted to contact with an operating lever 580 of the switch 581 causing the blade 582 to move into contact with the terminal 583 thereby delivering current from the connected relay bus 493 to said terminal. As soon as the lug 585 moves out of contact with the lever 580, the switch 581 returns to its neutral position by the tension of a spring not shown. The terminal 583 may be located to one side or the other of the switch 581 depending on the direction of travel of the charger 200 at the time when the desired contact is to be made. There are eight switches 581 respectively connected with the terminals 641 to 648 inclusive energizing the relay lines 631 to 638 inclusive and each of the switches 581 are appropriately located on the charger track 222 (see Fig. 26) relative to the passage along same of the charger lug 280 so as to cause the related operating effect to take place at the predetermined point in the travel to the left or to the right of the charger 200.

The line 631 connects to the terminal 641 appropriately located near the furnace 100 where deceleration of the charger 200 is to begin, thereby appropriately spreading its carried charge in said furnace, said terminal 641 being connected through the line 631 to actuate the stopping relay 574 (see Fig. 36) for opening the contactor 572 as above referred to.

The contactor 573 also receives relay current from the line 631 and is opened by the stopping relay 575 actuated by the line 632 connected to the terminal 642 located near the right-hand end of the charger track 222, said contactor 575 actuating the panel 571 controlling the motor 217 for the right-hand movement of the charger 200. Panels 570 and 571 are conventional automatic control panels and are electrically interlocked so that motor-starting current from the panel 571 is not delivered until the motor 217 has been substantially stopped under the control of the panel 570.

The terminal 643 (see Fig. 26) through the line 633 connects to a starting relay 651 (see Fig. 25) for closing the power contactor 652 controlling the conventional automatic panel 280 for the operation of the motor 258 driving the feeder 248, the speed of which is controlled through a shunt-field rheostat 281 on said panel, said terminal 643 being positioned on the charger track 222 relative to the moving charger lug 585 so as to cause the feeder 248 to start delivering charge to the charger 200 at the proper point in its travel to the right away from the furnace 100. The terminal 646 through the line 636 operates the stopping relay 655 causing the feeder 248 to be stopped as the charge receiving length of the charger 200 passes to the right of said feeder 248 for which purpose said terminal 646 is appropriately positioned near the right end of the charge track 221 and is separated from the terminal 643 by a distance substantially equal to the length to be charged on the charger 200. In like manner the terminals 644 and 645 operate to start the feeders 249 and 250 driven by their respective motors 258 not separately shown, and the terminals 647 and 648 serve to stop said feeders through means identical in principle with those for the feeder 248.

The conventional automatic control panels 540, 541, 542, 544 and 546 (see Fig. 36) are preferably provided with a time relay on the starting arrangement adjustable up to about two seconds delay in starting after the controlling power contactor as 550, etc., has closed. On panels 544, 546, 570 and 571 are shown the shunt-field rheostats respectively 535, 536, 537 and 538, which are manually adjustable for governing the speed of the related motors.

For a furnace of the approximately ninety foot length illustrated, the electric motor required may be about fifteen horsepower each for the charger, the rabbler and the backer, and five horsepower each for the three feeders shown. Each of these motors is to be started and stopped for each of the forty to fifty operating cycles per hour, and solenoid-operated band brakes have been specified for the stopping. The wear on these brakes may be reduced to a negligible amount by providing with said motors and their respective automatic control panels arrangements for dynamic braking whereby in decelerating a motor an electric current is generated and passed through a rheostat, the adjustable resistance of which determines the degree of the braking effect produced, all in the mode commonly used in the electrical arts. Such provision is therefore desirable for the purpose of minimizing the wear on the brake bands. In addition to the automatic controlling means herein described, the panels of all motive means will provide for the manual operation of the same, as is generally customary.

*Mode of operation*

I will now describe my preferred general mode of operation of the furnace and equipment herein specified, this description being supplemented in detail at various other places in the specification.

The temperature controlling-fluids will first be caused to circulate through all adapted parts of the furnace, the rabbler, the backer and the charger from suitable sources (not shown). A light wood fire will then be built in the crucible 101 which will be slowly heated to a temperature hot enough to melt lead when the latter will manually be charged to the crucible until it is substantially full of molten lead. By manual control of the charger 200 and suitable cooperating control of the feeders 248, 249 and 250, coke breeze and ore will be slowly charged to the furnace to be ignited by the remaining wood fire, the air-blast having been turned on through the tuyère openings 143 at a suitable time, (from a blast system not shown), the suction fans (not shown) having been started for drawing away from the furnace the gas being evolved. The rabbler 300 and the backer 400 may be put into irregular operation under manual control rather than by timed control as the furnace is being brought into regular smelting condition, and when the smelting charge is gotten into normal condition approximately filling the area 71 of Fig. 37, the furnace and its equipment will be placed under the control of the operation control system 500, on which will now be made the necessary adjustments as further noted.

The feeders 248, 249 and 250 will be appropriately adjusted as to depth of charge carried across the width of same as determined by the setting of the cut-off gate 268 and by adjustment of the speed of said feeders by means of the rheostats 281 on their respective motors, said motors being automatically started and stopped by the passage outward of the charger 200 as elsewhere described.

The speed of the charger 200 to the right as it leaves the furnace will be appropriately adjusted to about four feet per second by means of the rheostat 538 on the panel 571. The charger speed to the left toward the furnace will be adjusted by the rheostat 537 on the panel 570, this speed being adjustable over a considerable range as from ten to sixteen feet per second and so correlated with the rate of charger deceleration as predetermined by the adjustment of the brake 218 on the motor 217 as to give the dumping and spreading effect desired to the charge as it is deposited from said decelerating charger 200 in the furnace 100, the location of the terminal 641 along the charger track 222 being also appropriately adjusted to cause said decelerating effect to start at the right point relative to the furnace.

The speed of the rabbler poker 315 may be started at about thirty revolutions per minute adjustable by the rheostat 535 on the panel 544, and thereafter this speed will be adjusted as required for the discarding of the desired amount of the lump slag. The braking effect on the rabbler motor 337 will be so adjusted, together with the circular position of the terminal 511 contacted by the rabbler crank-shaft rotor finger 516, that the motor 337 will have appropriately decelerated so that when said finger 516 contacts the terminal 512, thereby causing the auxiliary brake 338 to be applied with a predetermined force, the rabbler mechanism may be brought to a stop with the poker 315 in about the predetermined part 58 (see Fig. 37) of its movement, such that it will not interfere with the shifting of the rabbler 300 relative to the backer 400, and with the said finger 516 still contacting with said terminal 512 thereby permitting said shifting to take place as controlled by the controller 500.

The speed of the backer shovel 415 may be started at about twenty-seven revolutions per minute adjustable by the rheostat 536 on the panel 546, and thereafter this speed will be adjusted as required for suitably backing the charge from its rabbled position approximately underlying the line 73 (see Fig. 37) back to its smelting position approximately in the area 71 and at the same time avoiding the excessive separation between the coarse and fines respectively ensuing if the backing action is made unnecessarily energetic, thereby producing an undesired degree of irregularity in permeability to the air blast in the cross-section of the smelting charge in the area 71 (see Fig. 37). The braking effect on the backer motor 437 will be so adjusted, together with the circular position of the terminal 509 contacted by the backer crank-shaft rotor finger 518, that the motor 437 will have appropriately decelerated so that when said finger 518 contacts the terminal 510, thereby causing the auxiliary brake 438 to be applied with a predetermined force, the backer mechanism may be brought to a stop with the shovel 415 in about the predetermined position 66 (see Fig. 37) and with the said finger 518 still contacting with said terminal 510 thereby permitting said shifting to take place as controlled by the controller 500.

The speed of the longitudinal movement of the rabbler 300 will be adjusted, by means of the manual adjustment of the hydraulic valve 356, for about two and a half inches per second, and so that the rabbler 300 arrives near the end of the right movement, from position 51 to 52 (see Fig. 28), with the poker 315 stroking about on the lines 47, which are intermediate to the lines 48 on which the poker strokes on the succeeding rabbling operation in the reverse direction, said lines 47 and 48 referring to the upward stroke of the point of the poker 315 on the path 59 (see Fig. 37) at the back of the crucible 101. It is to be understood that the scraping action of the poker 315 need not be kept on substantially the same lines 47 and 48 as shown in the drawings but that said lines are used for the purpose of illustration of the principles involved, and their actual location may be shifted somewhat from time to time relative to the crucible length, and still conform to the principles and method of my invention.

The initial hydraulic pressure from the hydraulic pump (not shown) is to be maintained constant and to have a suitable margin over the pressure actually used in the hydraulic cylinder 350 so as to permit of the pressure-drop through the regulating valve 356 for the purpose as specified, and also so that said initial pressure may be ample for imparting the high speed movement to the rabbler 300 when the valve 356 is automatically opened to a wider position for the rabbler movements from position 52 to position 53, and from position 55 to position 56 (see Fig. 28).

The lump slag conveying system comprising the conveyors 184, 187, 189, the elevator 190 and the screen 191 are all placed in operation, the screen being provided with openings of the desired size such as one inch mesh in the screening surface whereby the desired division may be made between the fines to be returned to the furnace and the coarse to be discarded from the system, it being understood that the size of the opening in the screen is to be modified as found advisable for any given type of charge.

To avoid too much heat on the surface of the smelting charge and in the furnace hood 146, it may be desirable to keep the inspection doors 173 partly open for the controlled infiltration of some outside air, as it is highly desirable to avoid a premature fusing effect of the freshly delivered charge while it is in the roasting stage.

As lead accumulates in the crucible in the furnace it may be tapped out from time to time so that the level in the crucible will generally approximate within an inch or so of the overflow level to the apron 128 care being taken to avoid troublesome overflows of lead on this apron.

A relatively large amount of dust and fume is evolved with the gas leaving a hearth-type furnace, and well-known means are available for recovering and returning the dust and fume and mixing them with the ore concentrate in its travel from the ore-storage building to the furnace charge bin, and all substantially mechanically. The dust may suitably be recovered from the hot gas leaving the furnace by passage through an efficient "cyclone" dust catcher. The gas with the remaining fume would then be cooled preferably by water sprays as now practiced in certain metallurgical plants, and the gas at about 200 degrees Fahrenheit would then be passed through an efficient high-duty baghouse filtering arrangement. While the equipment for handling the gas after it leaves the furnace is not here claimed as part of my invention, to obtain the full benefits possible from the controlled passage of air and gas through the furnace, an efficient gas, dust and fume handling system is required.

I have shown three charge bins 260, 261 and 262 intending them for coke breeze, concentrates and fume, etc., as a mixture, and return lump-slag. Any desired number of bins may be provided as most suited for any individual business. Appropriate means (not shown) will be provided for delivering ore, fuel, etc., to the charge bins.

At an appropriate time while preceding adjustments are progressing, the operation control timer 514 may be placed in automatic operation (it being understood for this as for all other generally automatically operated control apparatus, the contact can always be effected manually for special purposes). The timer may be started at twenty revolutions per hour effecting forty cycles per hour of operation or one and a half minutes per cycle, and thereafter further adjusted to obtain the best conditions, which, in the opinion of some operators treating Missouri galena concentrate would be at about one and a fourth minutes per cycle.

Having placed the furnace with its operating equipment in regular operating condition and generally in adjustment, the subsequent operation is very easily controlled. The frequency of charging (and of the rabbling and backing) is adjustable by the timer 514. The quantity of each unit charge is regulated by the speed of the charger 200 while loading, adjustable by the motor rheostat 538, without changing the proportions of the individual elements entering a charge, which latter are readily changed by adjustment of the feeder motor rheostats 281. Special distribution laterally of the charge is readily effected by solenoid operation of the charge-bin cut-off gates 268 by the switches 274. The amount of the lump-slag drawn off the furnace is adjustable by the rabbler motor rheostat 535.

I will now point out some of the novel features and advantages many of such having been pointed out elsewhere in this specification and many others not enumerated will be obvious to those skilled in the art.

The crucible of my invention comprises a continuous metallic trough with end walls, laterally and vertically firmly supported, and longitudinally supported preferably flexible each way from a fixed center support thereby permitting of harmless expansion and contraction longitudinally. In the prior art, the hot molten metal in the crucible generally comes in direct contact with the metallic trough, but such hot contact would tend to warp the greatly elongated crucible which I use, and I therefore provide a lining of generally low conductivity for heat, thereby limiting heat-induced warping stresses in said metallic trough, also reducing the heat losses from the crucible. Said metallic trough is preferably made with double walls enclosing a water-tight space adapted for the circulation therethrough of a temperature-controlling fluid for the purpose of maintaining the inner and outer walls of said casing within a sufficiently uniform range of temperatures such as to inhibit temperature-induced warping of said casing, and to maintain any joints, in and between the parts of said casing and the adjacent parts including its end walls, below the melting point of the molten metal in the operating crucible, the aforesaid casing preferably being manufactured in sections of readily handled lengths (such as fifteen feet), each said section being provided with flanges for attaching the adjacent parts of the crucible and the furnace structure as a whole.

To provide where wanted for the dissipation of heat from the crucible, I would substitute in the lining 114, of the crucible 101, material of higher average heat-conductivity, such as might be obtained by brick of relatively high-conductivity such as carborundum brick; or a similar effect could be gotten by substituting a certain proportion of highly-conductive cast-iron blocks shaped like the brick of the lining and which, contacting with a cooled metallic surface on the outside and with molten lead on the inside, would be highly efficient in disposing of heat.

Therefore some of the various functions of the crucible lining 114 are: first, to protect the casing from temperature-effects tending to warp an extremely long casing, although otherwise entirely permissible in contact with iron (as is the case with the short crucible of the prior art); second, as a heat-insulating device for promoting fuel economy in operation; third, as a controllable heat-conductive device to dissipate excess heat from the crucible content to a preferably water-cooled outer casing.

The apron 128 is adapted to support the rabbled charge generally underlying the line 73, and to facilitate the discarding of the lump slag, its width is restricted and it has enough slope so that during controlled rabbling the coarser lumps may roll across it, down the slope plate 132, and thence out of the furnace. Its contour generally conforms with the curved plane on line 61 (see Fig. 37) over which the shovel 415 sweeps, but there is a slight vertical clearance between the top of the apron 128 and the lower edge of the moving shovel 415 thereby minimizing the wear of one on the other. The dead-plate 139 and the slope plate 156 are used in connection with the proper charging of the furnace, being adapted to receive the charge irregularly dropped outside of the smelting length of the furnace 100 and together with the chute 182 and the cooperating backing shovel 415 of the backer 400, they provide means for mechanically delivering the discarded charge to a returning conveyor 184. The lump slag conveyor 187 is shown entirely outside the furnace 100 with its closure hood 146, the lump slag leaving the furnace through the doors 174. This conveyor could be placed in approximately the position occupied by the apron slope plate 132 thereby being substantially enclosed by the furnace with the hood thereof, and with the advantage that any fume arising from the hot lump slag would pass up and out with the gases of the furnace.

The hood 146 of the furnace has many novel features, some of which are now noted: (a) it is adapted to effect a substantially complete closure over and around the furnace of which it is a part; (b) it is provided with a part longitudinally movable in conjunction with the rabbler carriage, which part is provided with a narrow slot for each poker through which it may pass for its work on the furnace (said slot being readily closable if desired); (c) it is provided with a part longitudinally movable in conjunction with the backer carriage which part is provided with an opening through which the backer arm may operate while maintaining said opening substantially sealed; (d) it is provided with an opening into a chute 182 through which surplus charge may be ejected into the furnace; (e) it is provided with trap doors through which the discarded agglomerate may pass; (f) it is provided with inspection doors in a movable part providing for ready access to the furnace at any point along the length thereof; (g) for the charger are provided openings, automatically closable, through which said charger may move in its work on the furnace; (h) with all the doors into the hood closed, the infiltration of outside air to the furnace is reduced to a minimum, and by propping or holding said doors partly open or by removing part or all of some of the doors, adjustable openings may be provided for the controlled admission of air to the furnace, if desired for any reason such as cooling the surface of the smelting charge or preventing overheating of the mechanical parts inside the furnace; (i) the hood is divided into sections with expansion joints permitting of harmless longitudinal expansion relative to the furnace and the operating means connecting therewith; (j) in the hood is carried a charging track which is adapted for independent expansion, due to the furnace heat, by being pivotally supported from near the roof of the hood, or said track may be provided with expansion joints similar in effect to those shown for the hood; and (k) the hood is provided with an end extension piece having a sloping bottom adapted to receive surplus charge from the charger 200 and deliver same to the dead-plate 139.

The relatively moving parts of the hood are adapted for close contact with all adjacent parts of the hood or the furnace whereby the infiltration of outside air to the furnace is substantially excluded along the line of said contact. The hood therefore has many novel features and uses in cooperation with the furnace and the operating equipment thereof, and is especially adapted to confine the furnace gases to the channels provided therefor with a minimum or controlled admission of outside air.

In referring to the "entire" furnace area or length in this specification and in the claims appended therewith, I generally mean the active smelting area over which charge is to be distributed, or the length of the furnace to be rabbled, etc., and while in general I prefer to consider for these the entire smelting length of the furnace, the "entire" or equivalent terms are also applicable for any substantial length of the furnace worked as a unit. While less efficient, it is possible, by appropriate modification, to realize many of the advantages I obtain, even if the rabbler, backer, and charger were arranged to work on say one-half of a long furnace as one furnace unit, and in the mechanically-quiescent smelting period of the first half, shift one or more of the mechanical units to operate on the other half, such expedients however, being clearly within the spirit of my invention.

The rabbler 300 of my invention provides for a very simple mechanism, carried on a light frame required to move only a short distance, and having one pair of downwardly-extending operating arms supporting each shaft or beam 316 adapted to carry and impel a set of the pokers 315 for quickly rabbling about thirty feet of the furnace. The said frame is adapted to carry a plurality of the longitudinally spaced shafts 316 all operated from a single line-shaft, and thereby other furnace lengths such as ninety feet or one hundred and twenty feet may be rabbled in the same space of time and with entire uniformity. The charging system comprising the charger 200, the feeders 248, 249, 250 and related charging apparatus are all especially adapted to charge a long Scotch hearth furnace in co-operation with the rabbling and backing means herein described. Physically diverse elements of charge such as moist heavy ore concentrate, and light-weight coke breeze, handled by their respective feeders located accessibly and conveniently away from the furnace, may be assembled into a unit charge on the charger, therefrom to be deposited almost simultaneously over the length of the furnace in a controlled, generally horizontal layer, with each element of the charge accurately distributed throughout, and each well-mixed with the other. An advantageous systematic spreading action is effected as the charge from said moving charger is deposited in said furnace. The aforesaid charging system is being made the subject of a divisional application Serial No. 49,739. The rabbler pokers 315 are protected from the distorting and destructively corroding effects of the hot smelting charge by provision for the circulation of a cooling fluid through said pokers, which fluid may be air or oil rather than water on account of the explosive tendency of water if accidentally introduced into molten lead. The wear on the protected poker is extremely little and it may be repaired by the spot-welding of a resistant alloy steel on the worn poker part, thereby making the poker as a whole last for years. The ball-joint support of the poker on the shaft 316 permits of deflection freely in all directions of the poker relative to said shaft. The pokers 315, (and also the backer shovels 415) arranged as shown by the drawings will work concurrently, and also in unison as regards their relative position at any point on the working stroke. Working in unison is the most convenient for operation and control with my arrangement, but it is not essential in respect to the methods described in the specification and in the claims.

The backer 400 of my invention is adapted to cooperate with the rabbler thereof for operation in one or alternately in both directions longitudinally relative to the furnace. A single simple motor-driven mechanism imparts an oscillating rotary movement to a single longitudinal shaft carrying the spaced operating arms each with its backing shovel 415, and thereby a furnace of any related length may be quickly and uniformly backed. The backer and the rabbler are each provided with its own track so that the rabbler may be moved relative to the backer to assume the transposed positions as required for two-way rabbling and backing relative to the furnace length.

I provide preferably for cooperative rabbling and backing movements wherein the rabbling and backing mechanisms start operating substantially concurrently, the rabbler continuing to operate until it has rabbled the fixed length of furnace whereupon its mechanism is stopped and the rabbler carriage reverses its direction of travel with the backer carriage momentarily stationary, until the two carriages are respectively in transposed relation, whereupon the rabbler carriage travel again reverses in direction, and both carriages move together until the backer has completed the backing of the charge and the forward-end shovel is operating over the dead-plate at its end of the furnace, when all action ceases until the next operating cycle is started from the timer (see Fig. 28).

Other modes of rabbler and backer carriage movements are feasible by appropriate modifications in the detail of the controller arrangement. For instance, the rabbler and backer mechanisms may start substantially concurrent operation and the two carriages may proceed on their longitudinal travel. When the rabbler carriage has moved its operating distance, the rabbler mechanism may be stopped while both carriages proceed until the backer mechanism has operated over its operating distance and it comes into operating position with the forward dead-plate whereupon both backer mechanism and carriage, and the rabbler carriage all become stationary. At the beginning of the successive cycle, the rabbler carriage would travel the distance of about sixteen inches to bring it into the transposed relative position with the backer carriage, whereupon the active operating movements as previously described would proceed. This mode of rabbler and backer movements requires a somewhat longer travel by the rabbler carriage and its actuating hydraulic cylinder but has certain advantages.

The rabbling device of my invention has many novel functions. It is adapted: (a) to rabble uniformly and rapidly a furnace of great length such as one hundred feet more or less, by means of the plurality of the pokers 315 concurrently operated, said pokers being in suitably spaced relation for effecting quickly a concurrent rabbling of a like plurality of short spaced sections along the length of said furnace; (b) to cause the coarser lump slag of the smelting charge to be selectively and controllably discarded from the furnace, the rabbler mechanism being driven by a variable speed motor, the speed of which is readily adjustable by the rheostat 535, and the furnace apron 128 having a width and a slope all especially adapted for said object; (c) to limit the formation of accretions on the rear wall of the furnace crucible by scraping same on a plurality of series of spaced lines controllably positioned to effect a substantially longitudinally continuous scraping operation within every few minutes of operating, said controlled positions being readily adjustable by means of the rabbler movement speed control valve 356 in conjunction with the other adjustable means provided; (d) to work on the cycle of rabbler movement as shown in Fig. 28 and described therefor, or by adaptation of the control system, to work by other operating cycles; (e) to perform any of the various operations as outlined above and elsewhere, with only a negligible open area into the hood of the furnace through which the rabbling pokers move in their work, a movable part of the furnace hood being provided with slots for the pokers and held in fixed relation with the rabbler carriage for longitudinal movement therewith; (f) to provide a rabbler poker adapted to the circulation of a cooling fluid in order that a poker may work for days without change, as contrasted with the poker of the prior art which rapidly overheats and commonly has to be changed many times in each shift; (g) to impart longitudinal movement to the carriage of a backing device which works in close cooperation with said rabbling device; (h) to provide lateral support for the lower part of said backing device while in turn being in part vertically supported thereby; (i) to operate under the control of the automatic control system for imparting longitudinal movement in either direction to the carriage and imparting motion to the rabbling poker, all properly correlated with the furnace operation, as to the starting and also as to the automatically controlled stopping of said movement or motion at a pre-determined point thereof; (j) to obtain all these novel advantages by a novel and simple construction substantially free of requirements for maintenance and repair.

The backing device of my invention has many novel functions and is adapted: (a) to cooperate suitably in all respects with the aforesaid rabbling device in the rabbling and backing of a furnace of great length in a very short time; (b) to sweep the dead-plates 139 at each end of the furnace of the surplus charge accumulating thereon from the rabbling and backing operations and also that deposited from the charger 200; (c) to follow in operating position respective to the rabbler for a rabbling and backing operation conducted alternately in each direction along the furnace, the backer being provided with a substantially independent path for longitudinal movement relative to the rabbler when the backing shovel 415 and the rabbling poker 315 are temporarily held in stated parts of their respective operating motions as heretofore described; (d) to perform any of the various operations as outlined above and elsewhere, with only a negligible open area into the hood of the furnace through which the backer arms move in their work, a movable part of the furnace hood being provided with slots for said arms and being held in fixed relation with the backer carriage for longitudinal movement therewith; (e) to receive longitudinal movement imparted from the rabbler carriage or to remain in fixed position independent of the rabbler and at a predetermined point; (f) to operate under the control of the automatic control system for imparting longitudinal movement in either direction to the carriage and imparting motion to the backing shovel, all properly correlated with the furnace operation as to the starting, and also as to the automatically controlled stopping of said movement or motion at a pre-determined point thereof; (g) to provide vertical support for one side of the rabbling device while in turn being in part laterally supported thereby; (h) to obtain all these advantages by a novel and simple construction substantially free of requirements for maintenance and repair.

Both the rabbler and the backer are substantially novel throughout in regard to mechanical construction, mode of operation, means of control and ability to perform certain new functions, and in being generally adapted for the automatic operation of a large hearth type furnace.

The control system provides for the starting and the stopping of each of the mechanical movements or motions required for the operation of the furnace as described, all correlated as to time and/or position. By means of a plurality of adjustably placed terminals, a group of multipole relays are operated, and when certain connecting groups of contacts are concurrently closed by these relays, the respective related operation is caused to start or to stop. The relay current is preferably of low voltage and only a little current is required for each relay operation, and consequently the relays will operate indefinitely with a minimum of attention. Some of the functions performed by the controller system are as follows: (a) to maintain all of the mechanical operations on a definite relative time cycle, readily adjustable; (b) to start the movement of the rabbler and the backer carriages and to stop same, both at predetermined points; (c) to start and stop a movement of the rabbler carriage while holding the backer carriage uncoupled and stationary; (d) to cause the rabbler and the backer carriages to be coupled for movement together; (e) to start the rabbling poker mechanism and the backing shovel mechanism each at the proper time, and to stop each at a controlled point in the longitudinal travel along the furnace and in a controlled part of its respective operating motion; (f) to cause the charger to move to the furnace and to be controllably stopped, thereby dumping and spreading the charge in the furnace in a predetermined mode; (g) to cause the charger to pass out of the furnace and under the feeders and to have said feeders deliver a suitably proportioned and distributed charge to said charger as it passes under same; (h) to cause the various starting and stopping operations to take place controllably and smoothly, and entirely free of the jolts and jars inherent in the prior practice with its jaw-clutches and ratchet motions; all of which preceding control effects are automatically produced by the control system, and each and all are readily adjustable in every respect by the means herein described and shown. On account of the definite, timed correlation in the operations of rabbling, backing, discarding of agglomerate, and charging, all controlled and conducted in the best mode by the means provided, I obtain an operation always substantially uniform, and having a maintained maximum of operating efficiency. Contrasting with this in the prior art, a considerable part of the operators' time and effort is given in trying to correct for the continual irregularities substantially inherent with the manual control hitherto used in the operation of the Scotch hearth.

The automatic separation and removal of the lump slag from a hearth-type furnace is an important operation that hitherto has never been done without the use of manual labor.

I have found that the lump slag can be selectively discarded from the furnace by rabbling at a controlled velocity thereby causing the charge to change its position from that in the area 71 approximately (see Fig. 37), to that generally underlying the line 73 which extends out over the relatively narrow apron 128, over and off of which the discarded material is caused to pass. In this movement the larger lumps are selectively moved the farthest, and by suitably adjusting the speed of the rabbler mechanism by the rheostat 535, I can closely control the amount of lump material thus discarded, and which material therefore is not then subject to the immediately following backing operation.

By another mode of operation, I can rabble at a controlled slow speed to break up the caking charge but to substantially prevent its passing off the apron, and by speeding up the backing I can accentuate the rebounding effect therefrom so that I can cause a controlled amount of material to be discarded across the apron and out of the furnace. There are however certain disadvantages in this mode as it causes an excessive and unwanted segregation of the fines and the coarse across the width of the furnace, whereas in the first mode all is favorable and the backing may be conducted controllably solely with a view of securing a backing action as found best for the type of charge being smelted.

In the hitherto common practice of operating a hearth furnace provided with mechanical rabbling and backing means, there are four closely related operations in each operating cycle comprising (1) rabbling, (2) backing, (3) manually charging, and (4) manually and selectively discarding the lump slag; (all considered apart from much other manual work).

In my preferred improved method and with the equipment that I provide therefor, I reduce this to three automatic operations comprising, (1) rabbling, which breaks up the caking charge and concurrently imparts a movement thereto whereby the larger lumps are selectively discarded from the furnace, (2) backing, in which only that part of the charge then to be treated is backed, and (3) charging the furnace.

In my less preferred method of discarding the lumps concurrently in the backing operation, I effect the same reduction of the four older operations to three, though not with an equivalent advantage and economy of effort as in my preferred mode.

In principle, my method of selectively discarding lump-slag from the furnace is by imparting a movement to said charge whereby said lumps are selectively impelled to the means of egress provided therefor, said movement preferably being imparted by the rabbling means, said means of egress preferably being correlated with said imparted movement so as to require nothing more than the action of gravity to complete said discarding of a sufficient quantity of said lumps to outside of said furnace, the velocity of said imparted movement being preferably readily controllable whereby a controllable part of said lump slag may be discarded from said furnace, and all substantially free of manual labor.

I have described my preferred methods of operation, the preferred devices employed therewith and some of the advantages thereof, more especially as to each main part. However, the greater value of any said part lies in its relation to the method and equipment as a whole which in a broad way will now be in part briefly summarized: (1) a hearth type furnace readily capable of treating daily up to two hundred tons (or more) of high-grade lead concentrates; (2) a rabbling device, with a backing device, closely cooperating therewith, employing a plurality of rabbling pokers spaced about five feet apart and adapted for concurrent operation progressively so that with a five foot longitudinal movement the entire length of the furnace is rabbled; (3) neutralizing the tendency for the charge to be shifted longitudinally in the furnace (caused by the rabbling) by rabbling in opposite directions on alternate cycles; (4) selectively and controllably removing the lump slag, by rabbling through the charge at a controlled velocity, thereby causing a controlled amount of said lumps to be discarded from the furnace through a correlated and convenient means of egress provided therefor; (5) externally forming a unit charge for the furnace, suitably distributed in a thin layer on a charging device over an area substantially coextensive with the area to be charged in said furnace; (6) depositing said formed unit charge with a spreading effect such that the charge from one lineal inch of the charger is spread over a plurality of lineal inches of the furnace; (7) limiting the formation of accretions on the back of the furnace crucible by scraping same with the rabbler poker points operating up on a series of spaced lines along said crucible and alternately causing said lines to be intermediate in position to the lines of the preceeding series; (8) conducting the aforesaid operations on spaced time cycles preferably of about 1¼ minutes duration under automatic adjustable control, in which cycle (a) a rabbling and a substantially concurrent backing operation breaks up and reforms the entire furnace charge, automatically discarding therefrom the excess lump slag, (b) immediately thereafter a formed unit charge is suitably deposited in said furnace, and (c) a mechanically quiescent period of smelting ensues completing the cycle.

While my preference is for a stationary straight-line furnace with the operating devices movable relative thereto, certain of the methods of operation which I have described are applicable irrespective of whether the furnace is stationary or movable, and whether it is straight-line or circular, and I wish to preserve all my legal rights in any such modified form of application of the methods and devices of my invention.

With the greater economy in the construction and the operation of the hearth type furnace and equipment of my invention, it is possible that the field of its use may be economically extended beyond that of the field in which the prior hearth-type furnaces have been used. It is also possible that the furnace and equipment with a little, if any, modification, or certain parts thereof, may be adapted to the treatment of other materials, or to the production of other metals, or to a predominantly roasting operation rather than a combined and concurrent roasting and smelting or reducing operation. While in these specifications I have frequently referred to the treatment of lead bearing materials for the production of molten metal, it is to be understood that I do not wish to be limited in the scope of my claims by such references.

In reading these specifications and claims certain terms will be understood to have the meaning as here defined: "smelting" will be understood to refer to the treatment that takes place in the furnace whether it is roasting as for the elimination of sulphur, or whether it is the oxidation and/or the reduction of the metal to be recovered, or the smelting of substantially metallic charge, or the consumption of the fuel, etc.; "lump slag" will be understood as referring to any solid matter to be discarded in the operation of the furnace, it generally containing the scoriaceous or slag-forming elements of the charge, and also the metal not recovered in the molten state from the furnace crucible or passing out as dust or fume.

Although certain novel features of my invention have been shown and described and are pointed out in the annexed claims, it will be understood that various omissions, substitutions and changes in the several steps in the process and in its operation, as well as in the forms and details of the apparatus illustrated may be made by those skilled in the art without departing from the spirit of my invention. For instance, the process may be practiced by various sorts of mechanical devices varying in detail from its apparatus described.

What I claim is:

1. In combination with a hearth-type furnace, rabbling means, backing means, an elongated crucible adapted to carry molten metal substantially level full therein, a wall over one side of said crucible adapted to retain the smelting charge in said furnace and to admit air blast thereto, the other side of said crucible having a substantially continuous longitudinal open space thereover adapted to the passage therethrough of the rabbling and the backing means for their work on said smelting charge, said crucible comprising a longitudinal metallic casing and a support whereby said casing may longitudinally expand harmlessly and whereby it is maintained in substantially fixed alignment relative to said rabbling and backing means.

2. In combination with a hearth-type furnace, rabbling means, backing means, an elongated crucible adapted to carry molten metal substantially level full therein, a wall over one side of said crucible adapted to retain the smelting charge in said furnace and to admit air blast thereto, the other side of said crucible having a substantially continuous longitudinal open space thereover adapted to the passage therethrough of the rabbling and the backing means for their work on said smelting charge, said crucible comprising a longitudinal metallic casing and means for maintaining said longitudinal casing at a substantially uniform temperature throughout its cross-section to inhibit warping in same due to uneven temperatures.

3. In combination with a hearth-type furnace, rabbling means, backing means, an elongated crucible adapted to carry molten metal substantially level full therein, a wall over one side of said crucible adapted to retain the smelting charge in said furnace and to admit air blast thereto, the other side of said crucible having a substantially continuous longitudinal open space thereover adapted to the passage therethrough of the rabbling and the backing means for their work on said smelting charge, said crucible comprising a longitudinal metallic casing constructed with double metallic walls enclosing a space for and adapted to the circulation of a temperature-controlling fluid.

4. In combination with a hearth-type furnace, rabbling means, backing means, an elongated crucible adapted to carry molten metal substantially level full therein, a wall over one side of said crucible adapted to retain the smelting charge in said furnace and to admit air blast thereto, the other side of said crucible having a substantially continuous longitudinal open space thereover adapted to the passage therethrough of the rabbling and the backing means for their work on said smelting charge, said crucible comprising a longitudinal metallic casing provided with end walls and means for limiting the temperature at joints in and between parts of said casing and said end walls below the melting-point temperature of the molten metallic content of said crucible when in service, thereby inhibiting leakage of said molten metal.

5. In combination with a hearth-type furnace, a hood over said furnace, rabbling means, backing means, a crucible having a continuous opening over one longitudinal side thereof adapted for the access of said rabbling and backing means to the smelting charge, and an apron longitudinally disposed along the top of said open side of said crucible, and so extended outwardly as substantially to contact with the front plate of said hood, and means for maintaining said contact.

6. In combination with a hearth-type furnace, means for charging said furnace, means for working the smelting charge in said furnace, a closure hood comprising back, top, front and end sections adapted to confine the gases resulting from the operation of said furnace, and means connecting with said hood adapted for the outlet of said gases, said hood being provided with an opening thereto adapted for the access of said working means to said smelting charge and another opening adapted for the delivery of said charge into said furnace.

7. In combination with a hearth-type furnace, means for charging said furnace, means for working the smelting charge in said furnace, a closure hood comprising back, top, front and end sections adapted to confine the gases resulting from the operation of said furnace, and means connecting with said hood adapted for the outlet of said gases, said hood being provided with an opening adapted for the access of said working means to said smelting charge and another opening in the end of said hood adapted for the admission of said charging means for the delivery of said charge into said furnace.

8. In combination with a hearth-type furnace, movable means for charging said furnace, means for supporting said charging means for its movement through said furnace, means for working the smelting charge in said furnace, means for supporting said working means for movement along a path separate from that of said charging means, a closure hood comprising back, top, front and end sections adapted to confine the gases resulting from the operation of said furnace, means connecting with said hood adapted for the outlet of said gases, said hood being provided with an opening thereto adapted for the access of said working means to said smelting charge and another opening adapted for the delivery of said charge into said furnace, and means for closing said opening for charging when said charging means is not projecting therethrough.

9. In combination with a hearth-type furnace, means for working the smelting charge in said furnace longitudinally movable relative to said furnace, a crucible having a continuous opening over one side thereof adapted for access of said working means to said smelting charge, an apron disposed along the top of said open side of said crucible adapted momentarily to hold the said smelting charge as displaced and for replacing by said working means and for the passage over said apron of lump slag discarded from said charge, a closure hood comprising back, top, front and end sections adapted to confine the gases resulting from the operation of said furnace and substantially to prevent infiltration of outside air to same, said hood having a part movable relative to said furnace and in fixed relation with the longitudinal movement of said working means provided with slots adapted for the access of said working means to said smelting charge in said furnace and adapted substantially to contact with the adjacent stationary parts of said furnace including said apron, and means for movably maintaining said contacts.

10. Smelting apparatus of the character described with comprises a crucible, a carriage movable along said crucible; backing means mounted on said carriage; a shovel on said backing means for reciprocal movement over said crucible; a hood over said crucible having an opening therein to accommodate the movement of said backing means and a hood part carried by said carriage to substantially close said opening.

11. In combination with a hearth-type furnace, rabbling means, backing means, a dead-plate for receiving surplus charge extending longitudinally out from the end of the active smelting section of said furnace and adapted to be swept by said backing means, and means in the back of said hood adjacent to said dead-plate through which said surplus charge may be ejected.

12. In combination with a hearth-type furnace, working means longitudinally movable relative to said furnace, an apron along the front of said furnace over which may pass lump slag discarded therefrom by the action of said working means, a closure hood comprising back, top, front and end sections adapted to confine the gases resulting from the operation of said furnace and substantially to prevent infiltration of outside air to same, said hood having a part movable relative to said furnace and in fixed relation with the longitudinal movement of said working means provided with slots adapted for the access of said working means to said smelting charge in said furnace and adapted substantially to contact with the lower edge of said apron and being provided with an opening through which said lump slag may leave said apron and pass from said furnace, and means for closing said opening when not in use.

13. In combination with a hearth-type furnace, rabbling means provided with a poker adapted to rabble the smelting charge in said furnace, a closure hood comprising back, top, front and end sections adapted to confine the gases resulting from the operation of said furnace and substantially to prevent infiltration of outside air to same, said hood having a part movable relative to said furnace and in fixed relation with the longitudinal movement of said working means provided with a slot adapted for the access of said poker to said smelting charge in said furnace, and a fulcrum carried by said movable part of said hood adapted to support one end of said poker in its rabbling work in said furnace.

14. In combination with a hearth-type furnace, a rabbler comprising a plurality of spaced rabbling pokers, a horizontal shaft pivotally supporting one end of each of said pokers, mechanism for operating said shaft with a circular motion in a plane at right angles to its longitudinal axis, means to stop said shaft in a predetermined part of its circular motion, supporting means, means for imparting a longitudinal movement thereto relative to said furnace, and means for stopping said longitudinal movement at a predetermined point.

15. In combination with a hearth-type furnace, a rabbler comprising a plurality of spaced rabbling pokers, a horizontal shaft pivotally supporting one end of each of said tools, extended operating arms pivotally supporting said shaft, said arms being pivotally supported at spaced points by spaced cranks interconnected for parallel rotary motion, mechanism for operating said cranks and for stopping same in a predetermined part of their rotary motion, and supporting means therefor.

16. In combination with a hearth-type furnace, a rabbler comprising a rabbling porker pivotally supported at one end by an extended arm, said arm being pivotally supported at spaced points by spaced cranks interconnected for parallel rotary motion, mechanism for operating said cranks and for stopping same in a predetermined part of their rotary motion, supporting means, means for the longitudinal movement thereof relative to said furnace, and means for stopping said longitudinal movement at a predetermined point.

17. In combination with a hearth-type furnace, a rabbler comprising a rabbling poker, means for operating said poker, supporting means for said rabbler adapted to longitudinal movement relative to said furnace, means for imparting said longitudinal movement, a hood over said furnace having a part longitudinally movable relative to said furnace provided with a slot adapted to admit said rabbling poker to said furnace, and means for holding said movable part of said hood in substantially fixed relation with said rabbler supporting means for said longitudinal movement.

18. In combination with a hearth-type furnace, a rabbler comprising a plurality of spaced horizontal shafts each pivotally supporting a plurality of spaced rabbling tools, extending operating arms pivotally supporting said shafts, said arms being pivotally supported at spaced points by spaced cranks interconnected for parallel rotary motion, mechanism for operating said cranks, and means for imparting a longitudinal movement thereto relative to said furnace.

19. In combination with a hearth-type furnace, rabbling means, backing means, a generally vertical frame supporting one of said means, and a generally horizontal frame supporting the other means and carried at one side by a support effective both vertically and horizontally, the other side of said horizonal frame being supported vertically by said vertical frame and giving to the latter a horizontal lateral support.

20. In combination with a hearth-type furnace, a rabbler carriage, a backer carriage, means for longitudinally moving one of said carriages relative to said furnace, means for interlocking both of said carriages for longitudinal movement together, and means for disengaging said interlocking means.

21. In combination with a hearth-type furnace, a rabbler, a backer, said rabbler and said backer being relatively longitudinally movable and adapted to transposition of their relative working positions whereby rabbling and backing operations may be conducted in either direction along said furnace with said rabbler always leading said backer, and means for effecting said transposition.

22. In combination with a hearth-type furnace, a rabbler comprising a rabbling poker extending into the side of said furnace and thereby supported at one end; an operating shaft extending along said furnace adapted to receive a circular movement in a plane perpendicular to its length, and to support the other end of said poker positioned to extend underneath said shaft; a holder engaging said poker at spaced points longitudinally and mounted ball-joint fashion on said shaft; and means to adjust the position longitudinally of said poker in said holder.

23. In combination with a hearth-type furnace, means for working the charge in said furnace during a part of an operating cycle comprising a charge-working tool operated by said working means through a path of travel, a mechanism adapted to impel said tool, means for energizing and means for de-energizing said mechanism each said means acting in its respective predetermined part of said operating cycle, a braking means for said mechanism, means for applying said braking means for decelerating said mechanism when said tool is in a predetermined part of its path of travel and means for thereafter substantially increasing said braking effect causing said tool to be stopped in a predetermined part of its path of travel.

24. In combination with a hearth-type furnace, rabbling means comprising, a tubular rabbling poker adapted to extend into said furnace, a ball joint engaging the propelled end of said poker on said rabbling means providing for both a pivotal connection and for lateral angular deflection of said poker thereon, means for propelling the rabbler end of said poker with a generally circular motion in a vertical plane perpendicular to the length of said furnace, a closure for the furnace end of said tubular poker, inlet and outlet connections for the other end of said tubular poker adapted for the circulation therein of a cooling medium, a circulation system adapted to the forced circulation of said cooling medium, and a pivotal rotative flexible tubular connection between said circulating system and said inlet and outlet connections respectively on said poker adapted to accommodate its said vertically circular and laterally angular motions.

25. In combination with a hearth-type furnace, rabbling means comprising, a rabbling poker, a variable speed mechanism for the operation of said poker, a manually-operated speed control for said mechanism, a carriage, means for imparting movement to said carriage, a manually operated speed control for said movement, and controlling means adapted to the automatic cyclic operation of said rabbler on said furnace whereby the poker mechanism and the carriage movement respectively may be started and stopped each at any predetermined point in said cyclic operation, said speed controls and said controlling means also being adapted to the correlation of said poker operation and said carriage movement whereby said furnace may be rabbled with a plurality of strokes each successively effected on substantially uniformly spaced lines for the length of said furnace, and on repeating said rabbling operation causing said spaced lines of rabbling strokes when near the back of said furnace to be substantially intermediate to said lines of the preceding rabbling.

26. In combination with a hearth-type furnace, backing means comprising a pivotally-suspended generally-vertical operating arm, a backing shovel pivotally carried on the lower end of said arm, means to hold said shovel in charge-backing position relative to said arm on its working movement, means to rotate said pivoted shovel relative to said arm out of contact with said charge on its idling return movement, means optionally to hold said shovel out of contact with said charge on both said movements, means controllably to give said operating arm a swinging motion adapted to back said charge across said furnace, supporting means movable longitudinally relative to said furnace, and means for controllably effecting said longitudinal movement.

27. In combination with a hearth-type furnace, backing means comprising a plurality of pivotally-suspended generally-vertical spaced operating arms, a backing shovel pivotally carried on the lower end of each of said arms, means for controlling the pivotal position of said shovels relative to said arms, a longitudinal journaled shaft on which said arms are fixed, motive mechanism for giving said shaft an oscillating limited rotary motion, means for automatically starting and stopping said mechanism, supporting means movable longitudinally relative to said furnace, and means for controllably effecting said longitudinal movement.

28. In combination with a hearth-type furnace, a backer comprising a backing tool, means for operating said tool, supporting means for said backer adapted to longitudinal movement relative to and in operating relation with said furnace, means for imparting said longitudinal movement, a hood over said furnace having a longitudinally movable part provided with a slot adapted to admit said backing tool to said furnace, and means for holding said movable part of hood in substantially fixed relation with said backer supporting means for longitudinal movement therewith.

29. In combination with a hearth-type furnace, a crucible on which is floated the smelting charge which charge in smelting position has a vertical cross-section generally triangular in form with the vertical side resting against the longitudinal back of said furnace over said crucible, rabbling means, an apron extending along the front of said crucible and adapted to receive a portion of said charge when displaced by said rabbling means, and backing means having a generally vertical arm pivotally supported above and carrying a backing shovel below, adapted to sweep said apron and to back said charge to its said generally triangular cross-sectional form in its smelting position over said crucible, said apron and crucible being shaped and positioned relative to said backing means whereby an inward effective movement of said backing shovel following the arc of a circle will suitably back said charge.

30. In combination with a hearth-type furnace, a closure hood over said furnace, backing means longitudinally movable relative to said furnace, and a backer operating arm, said hood having a part movable in fixed relation with said longitudinally movable backing means and provided with a slot through which said arm enters said furnace, said hood being adapted substantially to enclose said operating arm in said furnace.

31. Smelting apparatus of the character described which comprises a smelting crucible; a carriage movable along said crucible; powered backing means mounted on said carriage; a shovel mounted on said backing means for reciprocal movement over said crucible; and means on said frame for adjustment of the amplitude of movement of said shovel with respect to said crucible.

32. Smelting apparatus of the character described which includes a smelting crucible; a carriage movable along said furnace, a rocker shaft on said carriage, backing means including an arm mounted on said shaft, a shovel mounted on said arm for reciprocal movement over said crucible, and means engageable with said shaft for adjusting the path of movement of said shovel with respect to said crucible.

33. In combination with a mechanically operated hearth-type charge-smelting furnace wherein is produced enlarging lumps of slag of which the larger lumps are to be selectively separated from the smelting charge and thence discarded out of said furnace; means for controllably separating and discarding said lump slag, including working means adapted to rabble said charge and thereby to impart a movement to said slag; an apron plate front part of said furnace adapted to receive said rabbled slag; and means to adjust the speed of the mechanism of said rabbler whereby a controllable portion of said slag may be impelled across said apron and out of said furnace.

34. In combination with a hearth-type smelting furnace, rabbling mechanism mounted on a carriage for traversing movement along said furnace; backing mechanism mounted on a second carriage for traversing movement along said furnace; charging means mounted on a third carriage for movement relative to said furnace and adapted to deposit a layer of fresh charge over a backed charge; a plurality of power means respectively adapted to impart traversing movements to said respective carriages; separate power means respectively adapted to operate said rabbling mechanism and said backing mechanism; and automatic means adapted to control the starting and stopping of each said carriage travelling movement and each said mechanism operation in a predetermined order and relation.

35. In combination with a hearth-type smelting furnace, rabbling mechanism mounted on a carriage for traversing movement along said furnace; backing mechanism mounted on a second carriage for traversing movement along said furnace; charging means mounted on a third carriage for movement relative to said furnace and adapted to deposit a layer of fresh charge over a backed charge; a plurality of power means respectively adapted to impart traversing movements to said respective carriages; separate power means respectively adapted to operate said rabbling mechanism and said backing mechanism; and automatic means adapted to control the starting and stopping of each said carriage travelling movement and each said mechanism operation in a predetermined order and relation, said control system including an adjustable timer adapted to periodically initiate successive operating cycles.

36. In combination with a hearth-type smelting furnace, rabbling mechanism mounted on a carriage for traversing movement along said furnace; backing mechanism mounted on a second carriage for traversing movement along said furnace; charging means mounted on a third carriage for movement relative to said furnace and adapted to deposit a layer of fresh charge over a backed charge; a plurality of power means respectively adapted to impart traversing movements to said respective carriages; separate power means respectively adapted to operate said rabbling mechanism and said backing mechanism; and automatic means adapted to control the starting and stopping of each of said carriage travelling movement and each said mechanism operation in a predetermined order and relation, said rabbling and backing mechanisms being adapted to operate their respective tools in orbits transverse to the direction of movement of said carriages, said several carriages being started and stopped in predetermined sequence of relations to each other, and to said furnace, and said rabbling and backing mechanisms being started and stopped at predetermined points in the travel of their respective carriages and being stopped in predetermined positions in their respective transverse orbits.

37. In combination with a hearth-type smelting furnace, rabbling mechanism mounted on a carriage for traversing movement along said furnace; backing mechanism mounted on a second carriage for traversing movement along said furnace; charging means mounted on a third carriage for movement relative to said furnace and adapted to deposit a layer of fresh charge over a backed charge; a plurality of power means respectively adapted to impart traversing movements to said respective carriages; separate power means respectively adapted to operate said rabbling mechanism and said backing mechanism; and automatic means adapted to control the starting and stopping of each said carriage travelling movement and each said mechanism operation in a predetermined order and relation, said rabbling and backing mechanisms being operative during traversing movements of their respective carriages in both directions.

38. In combination with a hearth-type smelting furnace, rabbling mechanism mounted on a carriage for traversing movement along said furnace; backing mechanism mounted on a second carriage for traversing movement along said furnace; a plurality of power means respectively adapted to impart traversing movements to said respective carriages; separate power means respectively adapted to operate said rabbling mechanism and said backing mechanism; and automatic means adapted to control the starting and stopping of each said carriage travelling movement and each said mechanism operation in a predetermined order and relation.

39. In combination with a hearth-type smelting furnace requiring cyclical rabbling and backing operations respectively along the length thereof; rabbler mechanism mounted on a powered carriage for travel and operation along said furnace; backer mechanism mounted on a second powered carriage for travel and operation along said furnace; rabbler control means adapted automatically to stop said rabbler mechanism operation at a predetermined point along said furnace, and thereupon to cause a reverse limited travel of said rabbler carriage to a non-interfering position relatively behind said backer; backer control means adapted automatically to hold said backer mechanism in non-interfering position in respect to said rabbler mechanism during said limited reverse travel of said rabbler carriage, and thereafter to cause said backer to continue said travel and operation.

40. The method of smelting charge in a hearth-type furnace provided with rabbling means, backing means, charging means, means of egress for lump slag and means for screening same, said method comprising, rabbling said furnace with a plurality of spaced concurrently operated pokers progressively moved relative to the length of said furnace, backing said furnace cooperatively in respect to said rabbling, discarding said lump slag from said furnace by imparting a movement to said furnace charge whereby an excess of said lump slag selectively is impelled to the means of egress provided therefor, screening said discarded lump slag, returning the finer screened part thereof to said furnace, and charging said furnace with fresh charge spread in a suitable layer therein.

41. The method of selectively discarding lump slag from a hearth-type furnace comprising, depositing in said furnace the charge to be smelted, working said charge so as to collect the slag-forming elements thereof into a lump slag to be discarded out of said furnace, imparting to said smelting charge a movement by rabbling causing its contained lump slag selectively to travel farther than the remaining charge, and correlating the velocity of action imparting said movement with the means of egress from said furnace for said lump slag whereby it is automatically discarded out of said furnace.

42. The method of controllably and selectively discarding lump slag from a hearth-type furnace comprising depositing in said furnace the charge to be smelted, working said charge so as to collect the slag-forming elements thereof into a lump slag to be discarded out of said furnace, imparting to said charge a controllable movement by rabbling causing its contained lump slag selectively to travel farther than the remaining charge, and correlating the velocity of action imparting said movement with the means of egress from said furnace for said lump slag whereby a controllable amount thereof is automatically discarded out of said furnace.

43. The method of discarding and handling lump slag from a hearth-type furnace comprising, depositing in said furnace the charge to be smelted, working said charge so as to collect the slag-forming elements thereof into a lump slag to be discarded out of said furnace, imparting to said smelting charge a movement causing its contained lump slag selectively to travel farther than the remaining charge, correlating the velocity of action imparting said movement with the means of egress from said furnace for said lump slag whereby an excess thereof is automatically discarded out of said furnace, screening said discarded slag, and returning the finer screened part thereof to said furnace.

44. The method of smelting charge in a hearth-type furnace provided with charging means, rabbling means, backing means, a crucible, a dead-plate longitudinally adjoining said crucible and having a top surface adapted to be swept by said backer and also to receive charge deposited thereon from said rabbling, backing and charging means respectively, said method comprising charging said furnace, rabbling the smelting charge in said furnace, backing said furnace, and sweeping said dead-plate by an added movement and operation of said backing means thereby discarding said charge therefrom out of said furnace.

45. The method of equalizing the distribution longitudinally of the rabbled smelting charge in a long hearth-type furnace provided with rabbling means, comprising rabbling said charge on a plurality of lines along said furnace at substantially equally spaced distances apart substantially concurrently, progressively shifting said rabbling lines relative to the length of said furnace until a distance substantially equal to that between said spaced lines has been rabbled thereby completing a charge rabbling operating along the full length of said furnace, and thereafter causing a said rabbling operation to progress in the opposite direction along the length of said furnace thereby neutralizing the longitudinal shifting of said charge in said furnace caused by a preceding rabbling.

46. The method of limiting accretions in the back of a hearth-type furnace provided with rabbling means having a rabbling tool, comprising rabbling said charge with a plurality of strokes each successively effected on substantially uniformly spaced lines for the length of said furnace, and on repeating said rabbling operation causing said spaced lines of rabbling strokes when near the back of said furnace to be substantially intermediate to said lines of the preceding rabbling.

47. The method of limiting accretions in the back of a hearth-type furnace provided with rabbling means, comprising rabbling on a plurality of lines along said furnace at substantially equally spaced distances apart substantially concurrently, progressively shifting said rabbling lines relative to the length of said furnace until a distance substantially equal to that between said spaced lines has been rabbled thereby completing a charge rabbling operation along the full length of said furnace, and on repeating said rabbling operation causing said spaced lines of rabbling near the back of said furnace to be substantially intermediate to said lines of the preceding rabbling operation.

48. The method of smelting in a furnace of the Scotch-hearth type, which includes the step of imparting to the charge being smelted a plurality of simultaneous rabblings on lines in spaced relation along said furnace, following said step by a step of imparting to said charge a plurality of simultaneous rabblings on lines in the same spaced relation and to one side of the lines of the previous step, repeating similar steps along said furnace whereby the charge along substantially the full length of said furnace is rabbled in such manner that the lines thus simultaneously rabbled in any step do not coincide with the lines simultaneously rabbled in the next preceding step.

49. The method of smelting in a furnace of the hearth-type, which includes the step of imparting to the charge being smelted a plurality of simultaneous rabblings on lines in equi-distant spaced relation along said furnace; following said step, by a step of imparting to said charge a plurality of simultaneous rabblings on lines in the same spaced relation and to one side of the lines of the previous step a distance substantially half of that between the spaced lines of said previous step; successively shifting the lines of simultaneous rabblings in the same direction by similar steps whereby to rabble the charge along substantially the full length of the furnace.

HUGH R. MacMICHAEL.